US012022851B2

(12) United States Patent
Rubinelli

(10) Patent No.: US 12,022,851 B2
(45) Date of Patent: Jul. 2, 2024

(54) **BACTERICIDAL PROTEIN FOR CONTROL OF *CAMPYLOBACTER* AND *LISTERIA***

(71) Applicant: THE BOARD OF TRUSTEES OF THE UNIVERSITY OF ARKANSAS, Little Rock, AR (US)

(72) Inventor: Peter M. Rubinelli, Fayetteville, AR (US)

(73) Assignee: THE BOARD OF TRUSTEES OF THE UNIVERSITY OF ARKANSAS, Little Rock, AR (US)

( * ) Notice: Subject to any disclaimer, the term of this patent is extended or adjusted under 35 U.S.C. 154(b) by 0 days.

(21) Appl. No.: 17/823,823

(22) Filed: Aug. 31, 2022

(65) Prior Publication Data

US 2023/0080731 A1 Mar. 16, 2023

Related U.S. Application Data

(60) Provisional application No. 63/239,230, filed on Aug. 31, 2021.

(51) Int. Cl.
*A23L 3/3463* (2006.01)
*A23L 3/3571* (2006.01)

(52) U.S. Cl.
CPC ......... *A23L 3/34635* (2013.01); *A23L 3/3571* (2013.01)

(58) Field of Classification Search
CPC ........................... A23L 3/34635; A23L 3/3571
USPC .......................................................... 426/326
See application file for complete search history.

(56) References Cited

U.S. PATENT DOCUMENTS

2015/0320830 A1* 11/2015 Teather ................ A61Q 17/005 424/93.4

OTHER PUBLICATIONS

Hughes, K.T. et al. (1993). Sensing structural intermediates in bacterial flagellar assembly by export of a negative regulator. Science 262, 1277-1280. doi: 10.1126/science.8235660.
Khelissa, S. et al. (2021). Conditions of nisin production by *Lactococcus lactis* subsp. Lactis and its main uses as a food preservative. Arch. Microbiol. 203, 465-480. doi:10.1007/s00203-020-02054-z.
Kim, S.A. et al. (2019). Potential for prebiotics as feed additives to limit foodborne Campylobacter establishment in the poultry gastrointestinal tract. Front. Microbiol. 10, 91-91. doi:10.3389/fmicb.2019.00091.
Nothaft, H. et al. (2016). Engineering the Campylobacter jejuni N-glycan to create an effective chicken vaccine. Sci. Rep. 6, 26511.
Park, S.H. et al. (2017). Original XPCTM effect on *Salmonella typhimurium* and cecal microbiota from three different ages of broiler chickens when incubated in an anaerobic in vitro culture system. Front. Microbiol. 8, 1070. doi: 10.3389/fmicb.2017.01070.

(Continued)

*Primary Examiner* — Brent T O'Hern
(74) *Attorney, Agent, or Firm* — Quarles & Brady, LLP

(57) ABSTRACT

The present invention provides anti-bacterial compositions comprising whole cells of an *Aneurinibacillus* bacterium designated as NH or an anti-bacterial protein expressed by NH. Additionally, the present invention provides methods of using the anti-bacterial compositions to inhibit the growth of bacteria such as *Campylobacter jejuni* and *Listeria monocytogenes*.

4 Claims, 26 Drawing Sheets

Specification includes a Sequence Listing.

(56) References Cited

OTHER PUBLICATIONS

Rubinelli, P. et al. (2016). Reduction of *Salmonella typhimurium* by fermentation metabolites of Diamond V Original XPC in an in vitro anaerobic mixed chicken cecal culture. Front. Vet. Sci. 3, 83. doi:10.3389/fvets.2016.00083.

Wyszyńska, A. et al. (2004). Oral immunization of chickens with avirulent *Salmonella* vaccine strain carrying C. jejuni 72Dz/92 cjaA gene elicits specific humoral immune response associated with protection against challenge with wild-type Campylobacter. Vaccine 22, 1379-1389. doi:https://doi.org/10.1016/j.vaccine.2003.11.001.

* cited by examiner

60 – 80 % 40 – 60 % 20 – 40 % CON

A

| | PC | D (6.18) | D (6.30) | CF (7.3) | 63R | 71R | 80R | 89R | 99R | NC | NC | NC |
|---|---|---|---|---|---|---|---|---|---|---|---|---|
| <> | 1 | 2 | 3 | 4 | 5 | 6 | 7 | 8 | 9 | 10 | 11 | 12 |
| A | 0.1948 | 0.0978 | 0.0668 | 0.2092 | 0.1889 | 0.1854 | 0.2107 | 0.164 | 0.0476 | 0.0447 | 0.0439 | 0.0435 |
| B | 0.2004 | 0.0714 | 0.0567 | 0.2217 | 0.1947 | 0.1865 | 0.1958 | 0.1896 | 0.1638 | 0.0465 | 0.0462 | 0.0463 |
| C | 0.2085 | 0.0607 | 0.0558 | 0.2078 | 0.2058 | 0.2115 | 0.2156 | 0.1996 | 0.1964 | 0.0487 | 0.0481 | 0.0475 |

| PC | Dialysate | IEF 1 | IEF 2 | IEF 3 | IEF 4 | IEF 5 | IEF 6 | IEF 7 | IEF 8 | IEF 9 | IEF 10 | NC |
|---|---|---|---|---|---|---|---|---|---|---|---|---|
| 0.2154 | 0.095 | 0.2539 | 0.2535 | 0.2225 | 0.2433 | 0.2279 | 0.2278 | 0.2265 | 0.0466 | 0.2581 | 0.2331 | 0.0432 |
| 0.2164 | 0.0698 | 0.2913 | 0.2778 | 0.2545 | 0.268 | 0.2511 | 0.2562 | 0.2669 | 0.2638 | 0.2824 | 0.2729 | 0.0479 |
| 0.2267 | 0.06 | 0.3007 | 0.2892 | 0.2843 | 0.2894 | 0.2689 | 0.2716 | 0.2685 | 0.2905 | 0.2883 | 0.2933 | 0.05 |
| 0.2293 | 0.0575 | 0.2947 | 0.3027 | 0.3018 | 0.2892 | 0.2712 | 0.2993 | 0.2876 | 0.2917 | 0.3009 | 0.3147 | 0.0524 |
| 0.2326 | 0.0552 | 0.2976 | 0.3417 | 0.3039 | 0.3031 | 0.2902 | 0.2867 | 0.2918 | 0.3167 | 0.3045 | 0.3109 | 0.0533 |
| 0.2300 | 0.2812 | 0.2962 | 0.3104 | 0.3135 | 0.3006 | 0.2867 | 0.2845 | 0.2881 | 0.2891 | 0.2997 | 0.3125 | 0.0522 |
| 0.2430 | 0.3143 | 0.3145 | 0.3033 | 0.3173 | 0.301 | 0.297 | 0.2875 | 0.2958 | 0.3089 | 0.2986 | 0.3168 | 0.0536 |
| 0.2348 | 0.3147 | 0.3156 | 0.3247 | 0.3292 | 0.3305 | 0.3153 | 0.3071 | 0.3096 | 0.3097 | 0.3093 | 0.3179 | 0.052 |
| | | | | | | | | | | | | |
| Conc. (mg/ml): | 2.98 | 0.088 | 0.36 | 0.27 | 0.64 | 0.88 | 1.63 | 1.39 | 0.56 | 0.18 | -4.6 | |
| | | | | | | | | | | | | |
| Sp. Act (endpt/mg): | 107.38 | 0 | 0 | 0 | 0 | 0 | 0 | 0 | 35.71 | 0 | 0 | |

| | PC | Pool | IEF1 | IEF2 | IEF3 | IEF4 | IEF5 | IEF6 | IEF7 | IEF8 | IEF9 | NC |
|---|---|---|---|---|---|---|---|---|---|---|---|---|
| <> | 1 | 2 | 3 | 4 | 5 | 6 | 7 | 8 | 9 | 10 | 11 | 12 |
| A | 0.66350001 | 0.0457 | 0.6239 | 0.5783 | 0.5511 | 0.6417 | 0.7322 | 0.0468 | 0.0464 | 0.7341 | 0.0458 | 0.0426 |
| B | 0.69849998 | 0.0495 | 0.6732 | 0.6574 | 0.6586 | 0.7113 | 0.7838 | 0.8115 | 0.0492 | 0.8233 | 0.8013 | 0.0454 |
| C | 0.73030001 | 0.0504 | 0.7277 | 0.6999 | 0.6937 | 0.7638 | 0.8108 | 0.813 | 0.8281 | 0.8374 | 0.8399 | 0.0468 |
| D | 0.7137 | 0.634 | 0.7132 | 0.7138 | 0.7197 | 0.7513 | 0.7875 | 0.8117 | 0.8334 | 0.8131 | 0.8369 | 0.0478 |
| E | 0.70810002 | 0.7426 | 0.6907 | 0.6935 | 0.6918 | 0.7294 | 0.7655 | 0.8056 | 0.8176 | 0.8059 | 0.8103 | 0.0484 |
| F | 0.69849998 | 0.7041 | 0.6891 | 0.6873 | 0.7107 | 0.7366 | 0.7658 | 0.7591 | 0.7784 | 0.7709 | 0.7762 | 0.0489 |
| G | 0.66339999 | 0.6957 | 0.6798 | 0.7075 | 0.6862 | 0.7336 | 0.7507 | 0.729 | 0.763 | 0.7482 | 0.7646 | 0.0491 |
| H | 0.59799999 | 0.639 | 0.7007 | 0.7053 | 0.6676 | 0.7097 | 0.7151 | 0.7342 | 0.7173 | 0.7247 | 0.6927 | 0.0497 |
| | | | | | | | | | | | | |
| **Protein conc. (mg/ml)** | | 1.57 | 0.54 | 0.94 | 1.10 | 1.14 | 1.54 | 1.83 | 1.08 | 0.43 | 0.68 | |
| | | | | | | | | | | | | |
| **Sp. Act. (Act./mg)** | | 50.90 | 0.00 | 0.00 | 0.00 | 0.00 | 0.00 | 10.95 | 37.14 | 0.00 | 29.52 | |

```
5' ATGAGAGTCGAAAGGCCAAATCAAATTCAGCCAATCAACCCGTATCGCCAGCAAGAAATG 60
5' AAGCAGGACGAAGCAAAGGCGAAGGGAAAAGGCCGCGATCAACTGGAAATCTCCAATGAG 120
5' GCGCTGGAGCTTCAGCGTACACAGGAGACAACAGCCGAACGCGCCGAGCGCATTGCTGAA 180
5' TTGAAAAAGAAGGTACAAGAAGGAACATATCATGTCGATGCGAAAGACATCGCGGAAGCA 240
5' TTACTGAAGAAAGGCCTATAA (SEQ ID NO: 1) 261
```

Figure 18

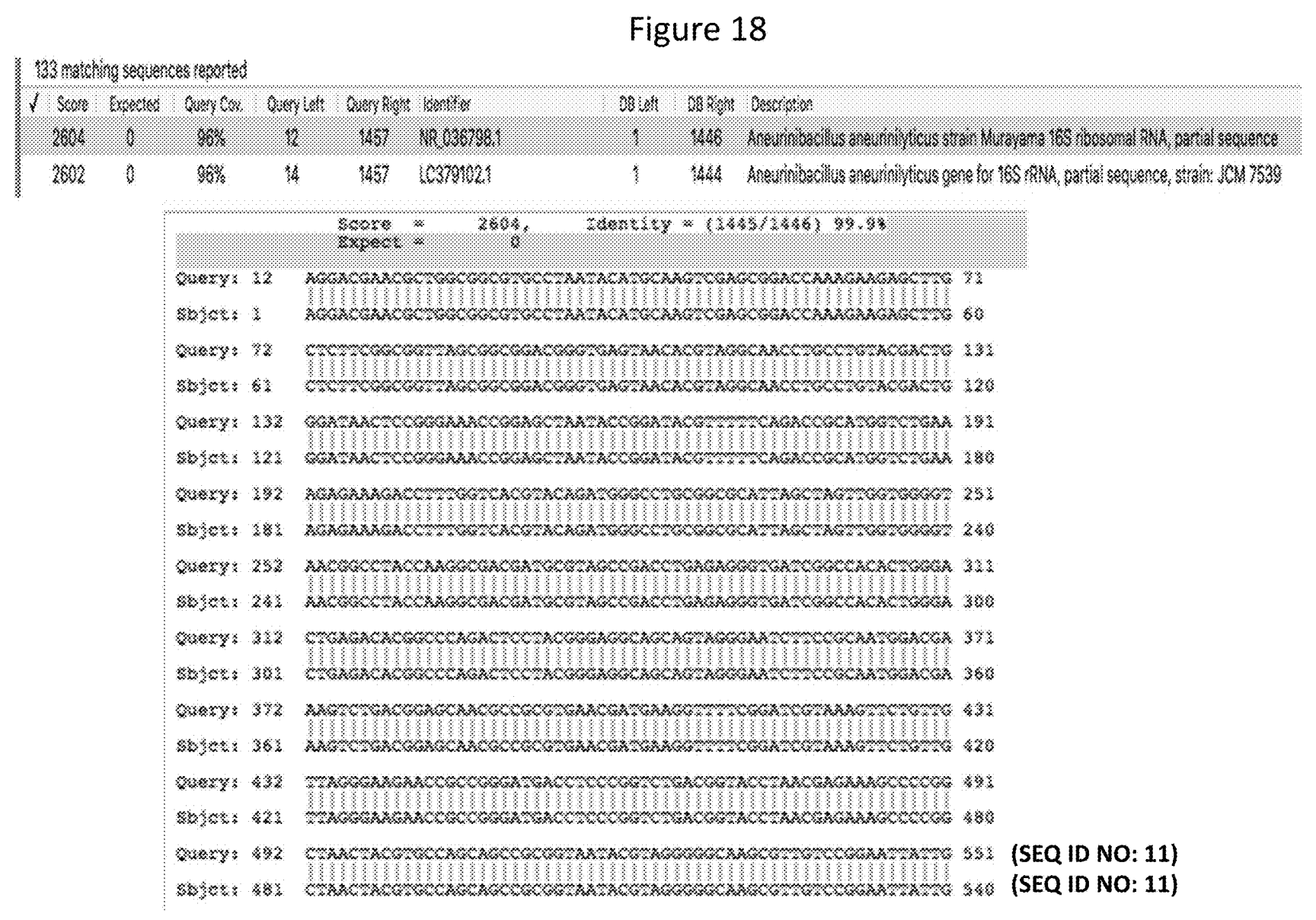

133 matching sequences reported

| ✓ | Score | Expected | Query Cov. | Query Left | Query Right | Identifier | DB Left | DB Right | Description |
|---|---|---|---|---|---|---|---|---|---|
| | 2604 | 0 | 96% | 12 | 1457 | NR_036798.1 | 1 | 1446 | Aneurinibacillus aneurinilyticus strain Murayama 16S ribosomal RNA, partial sequence |
| | 2602 | 0 | 96% | 14 | 1457 | LC379102.1 | 1 | 1444 | Aneurinibacillus aneurinilyticus gene for 16S rRNA, partial sequence, strain: JCM 7539 |

```
                 Score  =     2604,     Identity = (1445/1446) 99.9%
                 Expect =        0

Query: 12   AGGACGAACGCTGGCGGCGTGCCTAATACATGCAAGTCGAGCGGACCAAAGAAGAGCTTG 71
            ||||||||||||||||||||||||||||||||||||||||||||||||||||||||||||
Sbjct: 1    AGGACGAACGCTGGCGGCGTGCCTAATACATGCAAGTCGAGCGGACCAAAGAAGAGCTTG 60

Query: 72   CTCTTCGGCGGTTAGCGGCGGACGGGTGAGTAACACGTAGGCAACCTGCCTGTACGACTG 131
            ||||||||||||||||||||||||||||||||||||||||||||||||||||||||||||
Sbjct: 61   CTCTTCGGCGGTTAGCGGCGGACGGGTGAGTAACACGTAGGCAACCTGCCTGTACGACTG 120

Query: 132  GGATAACTCCGGGAAACCGGAGCTAATACCGGATACGTTTTTCAGACCGCATGGTCTGAA 191
            ||||||||||||||||||||||||||||||||||||||||||||||||||||||||||||
Sbjct: 121  GGATAACTCCGGGAAACCGGAGCTAATACCGGATACGTTTTTCAGACCGCATGGTCTGAA 180

Query: 192  AGAGAAAGACCTTTGGTCACGTACAGATGGGCCTGCGGCGCATTAGCTAGTTGGTGGGGT 251
            ||||||||||||||||||||||||||||||||||||||||||||||||||||||||||||
Sbjct: 181  AGAGAAAGACCTTTGGTCACGTACAGATGGGCCTGCGGCGCATTAGCTAGTTGGTGGGGT 240

Query: 252  AACGGCCTACCAAGGCGACGATGCGTAGCCGACCTGAGAGGGTGATCGGCCACACTGGGA 311
            ||||||||||||||||||||||||||||||||||||||||||||||||||||||||||||
Sbjct: 241  AACGGCCTACCAAGGCGACGATGCGTAGCCGACCTGAGAGGGTGATCGGCCACACTGGGA 300

Query: 312  CTGAGACACGGCCCAGACTCCTACGGGAGGCAGCAGTAGGGAATCTTCCGCAATGGACGA 371
            ||||||||||||||||||||||||||||||||||||||||||||||||||||||||||||
Sbjct: 301  CTGAGACACGGCCCAGACTCCTACGGGAGGCAGCAGTAGGGAATCTTCCGCAATGGACGA 360

Query: 372  AAGTCTGACGGAGCAACGCCGCGTGAACGATGAAGGTTTTCGGATCGTAAAGTTCTGTTG 431
            ||||||||||||||||||||||||||||||||||||||||||||||||||||||||||||
Sbjct: 361  AAGTCTGACGGAGCAACGCCGCGTGAACGATGAAGGTTTTCGGATCGTAAAGTTCTGTTG 420

Query: 432  TTAGGGAAGAACCGCCGGGATGACCTCCCGGTCTGACGGTACCTAACGAGAAAGCCCCGG 491
            ||||||||||||||||||||||||||||||||||||||||||||||||||||||||||||
Sbjct: 421  TTAGGGAAGAACCGCCGGGATGACCTCCCGGTCTGACGGTACCTAACGAGAAAGCCCCGG 480

Query: 492  CTAACTACGTGCCAGCAGCCGCGGTAATACGTAGGGGGCAAGCGTTGTCCGGAATTATTG 551 (SEQ ID NO: 11)
            ||||||||||||||||||||||||||||||||||||||||||||||||||||||||||||
Sbjct: 481  CTAACTACGTGCCAGCAGCCGCGGTAATACGTAGGGGGCAAGCGTTGTCCGGAATTATTG 540 (SEQ ID NO: 11)
```

BACTERICIDAL PROTEIN FOR CONTROL OF *CAMPYLOBACTER* AND *LISTERIA*

CROSS-REFERENCE TO RELATED APPLICATIONS

This application claims priority to U.S. Provisional Application No. 63/239,230 filed on Aug. 31, 2021, the contents of which are incorporated by reference in their entireties.

STATEMENT REGARDING FEDERALLY SPONSORED RESEARCH

NR

SEQUENCE LISTING

A Sequence Listing accompanies this application and is submitted as an XML file of the sequence listing named "169946.00690.xml" which is 14,395 bytes in size and was created on Nov. 2, 2022. The sequence listing is electronically submitted via Patent Center and is incorporated herein by reference in its entirety.

BACKGROUND

*Campylobacter jejuni* is a species of pathogenic bacteria that is one of the most common causes of human gastroenteritis in the world. *C. jejuni* is commonly associated with poultry and is found in animal feces. Chickens are frequently colonized with *C. jejuni* as a commensal organism in their intestinal tract. This tract often ruptures during slaughter of the chickens in modern, high-intensity chicken processing, sending contents of the intestines onto the chicken carcass and meat. Although some of the intestinal contents are rinsed off during the chilling process, significant numbers of *Campylobacter* can remain on the meat, potentially causing disease in consumers. Other approaches to control *Campylobacter* in chickens have focused on pre-harvest control through vaccination against *Campylobacter*. However, these approaches have not been commercially successful to date due to the great genetic diversity of *Campylobacter*, which limits the ability of any one attenuated or killed strain of *Campylobacter* to successfully control all *Campylobacter* through host immunity. Probiotics and prebiotics have also been of limited use because they have not reduced *Campylobacter* numbers sufficiently enough to be very effective. These treatments typically reduce *Campylobacter* numbers by 1 log CFU/g, or a ten-fold reduction, but *Campylobacter* is normally present in the hindgut of chickens at much higher concentrations (e.g., 6 log CFU/g).

*Listeria monocytogenes* is a species of pathogenic bacteria that can survive and even grow under refrigeration and other food preservation measures. When people eat food contaminated with *L. monocytogenes*, they may develop a disease called listeriosis, which can result in severe sepsis, meningitis, or encephalitis. *L. monocytogenes* can be transmitted when food is harvested, processed, prepared, packed, transported, or stored in environments contaminated with *L. monocytogenes*. Past listeriosis outbreaks in the U.S. have been linked to raw, unpasteurized milks and cheeses, ice cream, raw or processed vegetables, raw or processed fruits, raw or undercooked poultry, sausages, hot dogs, deli meats, and raw or smoked fish and other seafood.

Thus, there remains a need in the art for anti-bacterial agents that can be used to inhibit the growth of these food-borne pathogens.

SUMMARY

In a first aspect, the present invention provides anti-bacterial compositions comprising an *Aneurinibacillus* bacterium designated as NH and deposited at the ARS Culture Collection (NRRL) under accession number B-68337, a protein precipitate from the NH bacterium, or one or more anti-bacterial proteins from the NH bacterium. In preferred embodiments, the one or more anti-bacterial proteins comprises the FlgM protein SEQ ID NO: 2.

In a second aspect, the present invention provides constructs comprising a heterologous promoter operably linked to a polynucleotide encoding a polypeptide with at least 95% identity to SEQ ID NO: 2.

In a third aspect, the present invention provides methods of preparing an anti-bacterial composition. The methods comprise isolating an anti-bacterial protein from the NH bacterium.

In a fourth aspect, the present invention provides food products that have been contacted with the NH bacterium, an anti-bacterial protein from the NH bacterium, one of the anti-bacterial compositions described herein, an anti-bacterial composition obtained by the methods described herein, or any combination thereof.

In a fifth aspect, the present invention provides methods for inhibiting the growth of one or more bacteria in a food product. The methods comprise contacting the food product with an effective amount of a composition to inhibit the growth of the bacteria in the food product. The composition used in this method may comprise: the NH bacterium, an anti-bacterial protein from the NH bacterium, one of the anti-bacterial compositions described herein, an anti-bacterial composition obtained by the methods described herein, or any combination thereof.

In a sixth aspect, the present invention provides methods for disinfecting a surface that has potentially been contaminated with one or more bacteria. The methods comprise contacting the surface with an effective amount of a composition to reduce the number of bacteria on the surface. The composition used in this method may comprise: the NH bacterium, an anti-bacterial protein from the NH bacterium, one of the anti-bacterial compositions described herein, an anti-bacterial composition obtained by the methods described herein, or any combination thereof.

BRIEF DESCRIPTION OF THE DRAWINGS

FIG. 15 shows the nucleotide sequence of the open reading frame (ORF) of the flgM gene of strain NH (SEQ ID NO: 1).

6); WP_220559155=*A. thermoaerophilus* FlgM (SEQ ID NO: 7); and flgM_XH2_transl=*Aneurinibacillus* sp. XH2 FlgM (SEQ ID NO: 8). The consensus sequence (SEQ ID NO: 9) and a sequence logo representing a position weight matrix derived from the aligned sequences are also shown.

Figure 17:
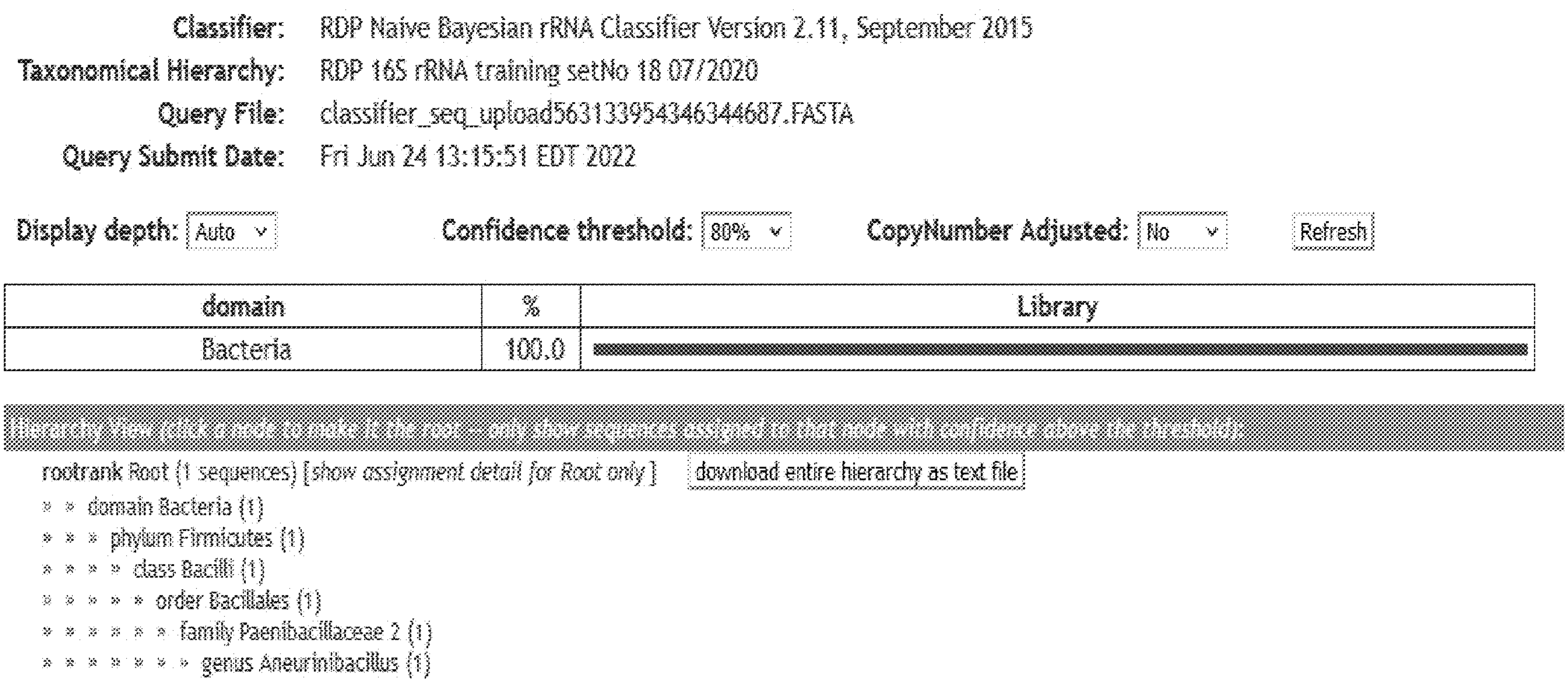

FIG. 17 shows the results of an RDP database search using a PCR-amplified 16s rRNA gene V4 region sequence from strain NH genomic DNA.

FIG. 18 shows the results of a BLASTn algorithm search against all non-redundant nucleotide sequence data at NCBI using the full-length NH 16s rRNA gene (SEQ ID NO: 10) as query. The top match is to species *Aneurinibacillus aneurinilyticus* strain Murayama with 99.9% sequence identity. Only part of the alignment is shown (SEQ ID NO: 11).

Figure 19:
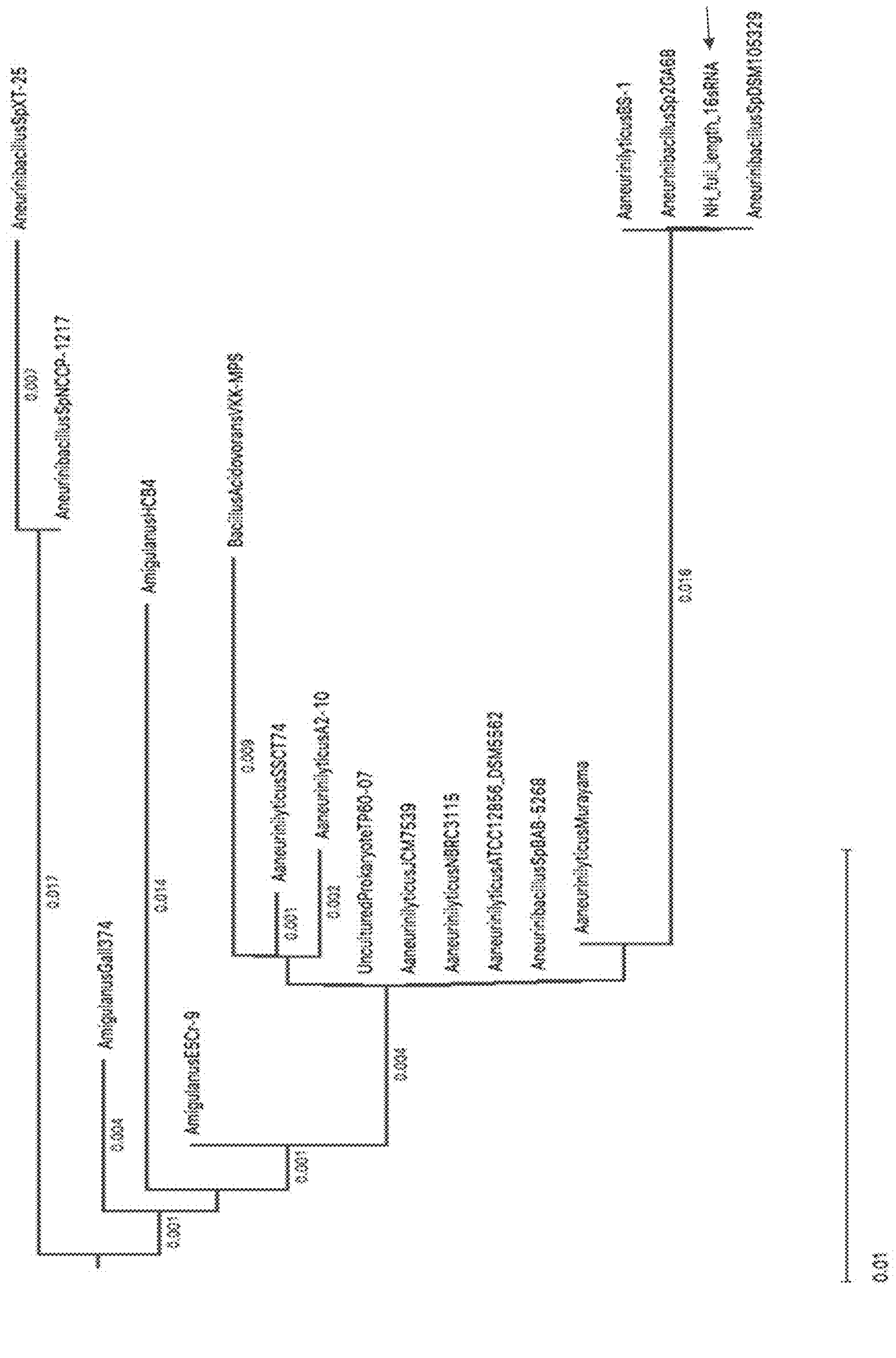

FIG. 19 shows a maximum likelihood algorithm-generated phylogenetic tree of MAFFT-aligned 16s rRNA gene sequences with bootstrap analysis for a small portion of the *Aneurinibacillus* genus. The "A" prefix in each name containing a species name is an abbreviation for the *Aneurinibacillus* genus (e.g., "Amigulanus" represents *Aneurinibacillus migulanus*). Species that lack a Latin species name are indicated by "Sp" preceding the species name (e.g., "*Aneurinibacillus*SpXT-25"). Numbers below branches represent the relative distance of each phyletic group to the common ancestor. Arrow points to the NH 16s rRNA gene sequence location within the tree.

DETAILED DESCRIPTION

The present invention pertains to the control of *Campylobacter* and *Listeria*, two foodborne bacterial pathogens that are often associated with raw meat and ready-to-eat foods. In the Examples, the inventors describe their discovery of a bacterium that inhibits the growth of both *Campylobacter jejuni* and *Listeria monocytogenes*. This bacterium, which has been designated as NH and deposited at the ARS Culture Collection (NRRL) under accession number B-68337 (referred to hereafter as "strain NH" or "the NH bacterium"), is a species of bacteria of the genus *Aneurinibacillus* that is easily grown as a pure culture in the laboratory. *Aneurinibacillus* bacteria are aerobic and endospore-forming bacteria from the family Paenibacillaceae. The inventors determined that a protein secreted by the NH bacterium is responsible for its bactericidal activity. Thus, either the whole bacterium or this anti-bacterial protein may be used as a natural biopreservative.

In Example 1, the inventors demonstrate that co-culture with the NH bacterium reduces the growth of *C. jejuni* and *L. monocytogenes* by up to 7 log CFU/mL. This level of reduction is much greater than the 0.5-1 log inhibition achieved with prebiotics and probiotics and is comparable to that achieved with to the most effective experimental vaccines. However, this bacterium offers several advantages over vaccination, including that (1) it offers broader spectrum microbial control (i.e., controls multiple pathogen species), and (2) it can be incorporated into food products or packaging. In Example 2, the inventors determine that the bactericidal protein secreted by the NH bacterium is an FlgM protein and that the NH bacterium is highly related to the species *Aneurinibacillus aneurinilyticus.*

Anti-Bacterial Compositions:

In a first aspect, the present invention provides anti-bacterial compositions comprising either (1) whole cells of the NH bacterium, (2) a protein precipitate of the NH bacterium, or (3) one or more anti-bacterial proteins from the NH bacterium.

As used herein, the term "protein precipitate" refers to protein that has been precipitated out of a solution (i.e., made to become insoluble, aggregate, and crash out). Protein precipitation is commonly used to separate a protein from any extra contaminants that may be mixed with it.

The anti-bacterial compositions of the present invention are "anti-bacterial" in that they can be used to control bacteria. In the Examples, the inventors demonstrated that the NH bacterium or proteins secreted therefrom can be used inhibit the growth of *Campylobacter jejuni* and *Listeria monocytogenes*. Thus, in some embodiments, the compositions can be used to control *Campylobacter jejuni, Listeria monocytogenes*, or other bacteria, including, without limitation, *Escherichia coli, Salmonella, Staphylococcus aureus*, and *Clostridium*. In some embodiments, the anti-bacterial compositions inhibit the growth of one or more species of bacteria.

In the Examples, the inventors determined that the active substances that allows the NH bacterium to inhibit the growth of *Campylobacter jejuni* and *Listeria monocytogenes* are secreted proteins that are approximately 50 kDa and 12 kDa in size. Thus, in some embodiments, the anti-bacterial composition comprises one or more anti-bacterial proteins with a molecular weight of about 50 kDa and/or about 12 kDa. As used herein, an "anti-bacterial protein" is a protein that kills or reduces the growth of one or more bacterium. In Example 2, the inventors determined that the 12 kDa anti-bacterial protein is an FlgM protein, i.e., a bacterial protein involved in flagellum biosynthesis. The FlgM protein expressed by the NH bacterium has an amino acid sequence of SEQ ID NO: 2 and is encoded by the DNA sequence of SEQ ID NO: 1 in the NH bacterium genome. The inventors hypothesize that the 12 kDa FlgM protein forms a 50 kDa multi-subunit complex in its native form. Thus, in some embodiments, the anti-bacterial composition comprises the FlgM protein of SEQ ID NO: 2.

In some embodiments, the anti-bacterial compositions further comprise a carrier. Carriers are known in the art and include, but are not limited to, diluents (e.g., Tris-HCl, acetate, phosphate), preservatives (e.g., Thimerosal, benzyl alcohol, parabens), solubilizing agents (e.g., glycerol, polyethylene glycerol), emulsifiers, liposomes, nanoparticles, and adjuvants. Carriers may be aqueous or non-aqueous solutions, suspensions, or emulsions. Examples of nonaqueous solvents are propylene glycol, polyethylene glycol, vegetable oils such as olive oil, and injectable organic esters such as ethyl oleate. Aqueous carriers include isotonic solutions, alcoholic/aqueous solutions, emulsions, or suspensions, including saline and buffered media. In preferred embodiments, the carrier is safe for consumption by humans and animals.

Constructs:

In a second aspect, the present invention provides constructs comprising a heterologous promoter operably linked to a polynucleotide encoding a protein with at least 95% identity to SEQ ID NO: 2. In some embodiments, the polynucleotide comprises SEQ ID NO: 1, i.e., the open reading frame that encodes the FlgM protein in the NH bacterium genome, or a polynucleotide having at least 90%, 95%, 98%, or 99% identity to SEQ ID NO: 1.

The term "polynucleotide" refers to a polymer of DNA or RNA. A polynucleotide may be single-stranded or double-stranded and may represent the sense or the antisense strand. A polynucleotide may be synthesized or obtained from a natural source. A polynucleotide may contain natural, non-natural, or altered nucleotides, as well as natural, non-natural, or altered internucleotide linkages (e.g., phosphoroamidate linkages, phosphorothioate linkages).

The term "construct" refers to a recombinant polynucleotide, i.e., an artificially constructed polynucleotide that includes polynucleotide sequences derived from at least two different sources. The constructs described herein may be prepared by using standard techniques such as cloning, DNA and RNA isolation, amplification, and purification.

A "promoter" is a DNA sequence that defines where transcription of a coding sequence (i.e., a DNA sequence that encodes a protein or functional RNA) begins. RNA polymerase and the necessary transcription factors bind to the promoter to initiate transcription. Promoters are typically located directly upstream (i.e., at the 5' end) of the transcription start site. However, a promoter may also be located at the 3' end, within a coding region, or within an intron of a gene that it regulates. Promoters may be derived in their entirety from a native or heterologous gene, may be composed of elements derived from multiple regulatory sequences found in nature, or may comprise synthetic DNA. A promoter is "operably linked" to a gene if the promoter is positioned such that it can affect transcription of the gene. The promoters of the present invention are "heterologous," meaning they are not naturally associated with the polynucleotide to which they are operably linked.

"Percentage of sequence identity" is determined by comparing two optimally aligned sequences over a comparison window. The aligned sequences may comprise additions or deletions (i.e., gaps) relative to each other for optimal alignment. The percentage is calculated by determining the number of matched positions at which an identical nucleic acid base or amino acid residue occurs in both sequences, dividing the number of matched positions by the total number of positions in the window of comparison and multiplying the result by 100 to yield the percentage of sequence identity. Protein and nucleic acid sequence identities are evaluated using the Basic Local Alignment Search Tool ("BLAST"), which is well known in the art (Proc. Natl. Acad. Sci. USA (1990) 87: 2267-2268; Nucl. Acids Res. (1997) 25: 3389-3402). The BLAST programs identify homologous sequences by identifying similar segments, which are referred to herein as "high-scoring segment pairs", between a query amino acid or nucleic acid sequence and a test sequence which is preferably obtained from a protein or nucleic acid sequence database. Preferably, the statistical significance of a high-scoring segment pair is evaluated using the statistical significance formula Proc. Natl. Acad. Sci. USA (1990) 87: 2267-2268), the disclosure of which is incorporated by reference in its entirety. The BLAST programs can be used with the default parameters or with modified parameters provided by the user.

Methods of Preparing an Antibacterial Composition:

In a third aspect, the present invention provides methods of preparing an anti-bacterial composition. The methods comprise isolating an anti-bacterial protein of the NH bacterium.

As used herein, the terms "isolating" and "purifying" are used interchangeably refer to a process by which a protein is separated from other cellular components that normally accompany it in its native state. In some embodiments, the anti-bacterial protein is expressed by the NH bacterium and isolated therefrom. In other embodiments, a nucleic acid encoding the anti-bacterial protein is introduced into another host organism (e.g., a bacterium that produces high levels of protein or a yeast) and the anti-bacterial protein is expressed by the host organism and isolated therefrom. Methods for generating transgenic organisms that express the anti-bacterial proteins described herein are known in the art.

In some embodiments, the anti-bacterial protein is isolated via precipitation. Protein precipitation is commonly used to concentrate proteins and purify them away from various contaminants. Salting out is the most common method used to precipitate a protein. In salting out, addition of a neutral salt (e.g., ammonium sulfate) compresses the solvation layer and increases protein-protein interactions. As the salt concentration of a solution is increased, the charges on the surface of the protein interact with the salt, not the water, thereby exposing hydrophobic patches on the protein surface and causing the protein to fall out of solution (i.e., aggregate and precipitate). Other suitable protein precipitation methods include, without limitation, isoelectric precipitation, precipitation with a miscible solvent (e.g., ethanol, methanol), precipitation with non-ionic hydrophilic polymers (e.g., dextrans, polyethylene glycols), flocculation by polyelectrolytes, and precipitation with polyvalent metallic ions. In the Examples, the inventors demonstrate that protein precipitates prepared using 20-40% and 40-60% ammonium sulfate completely prevented the *Campylobacter* from growing in culture. Thus, in some embodiments, the anti-bacterial protein is precipitated using ammonium sulfate. In specific embodiments, the concentration of ammonium sulfate used to precipitate the anti-bacterial protein is between about 20% and about 60% by volume.

In the Examples, the inventors further purified the anti-bacterial protein using two different ion exchange treatments: anion exchange (e.g., using Q Sepharose resin) and cation exchange (e.g., using SP Sepharose resin). While the anti-bacterial protein failed to bind to the anion exchange resin, other proteins bound to this resin and were thus purified away. The anti-bacterial protein did bind to the cation exchange resin and was eluted from it using a salt gradient, which separates the bound proteins by their relative amounts of positive electrical charge under the pH condition used (pH 5.0). Thus, in some embodiments, the anti-bacterial protein is isolated via ion exchange chromatography.

Additionally, the inventors further purified the anti-bacterial protein using isoelectric focusing (IEF). IEF is an electrophoretic technique that is used to separate molecules according to their isoelectric point (pI). In this technique, an electric field is applied along a pH gradient formed in a capillary. Thus, in some embodiments, the anti-bacterial protein is isolated via IEF.

In the Examples, the inventors prepared protein precipitates from a cell-free filtrate of the NH bacterium. Thus, in some embodiments, the methods further comprise preparing a cell-free filtrate of this bacterium. As used herein, the term "cell-free supernatant" refers to a cell culture supernatant that has been separated from the cells that had been growing in it. A cell-free supernatant can be prepared by simply removing the supernatant from a culture of cells. If the cells are adherent, it may be possible to remove the supernatant without dislodging the cells from the culture dish. However, in some cases (e.g., in suspension culture) it will be advantageous to centrifuge the supernatant to pellet any cells and transfer the cleared supernatant to a fresh container. The term "filtrate" refers to a liquid that has passed through a filter. Thus, the term "cell-free filtrate" refers to cell culture supernatant that has been filtered. In the Examples, the inventors separated the culture supernatant from the cells via filtration through a membrane having 0.2 micrometer pores, which acts as a barrier to the cells.

Any of the protein purification techniques described herein may be used alone or in combination with each other and with other known protein purification techniques to isolate antibacterial proteins produced by the NH bacterium. Examples of other protein purification techniques include, without limitation, dialysis, affinity chromatography, size-exclusion chromatography, hydrophobic interaction chromatography, high pressure liquid chromatography (HPLC), electrophoresis, solvent extraction, DuPont™ AmberLite™ XAD™7HP aliphatic absorption resin, and the like.

Food Products:

In a fourth aspect, the present invention provides food products that have been contacted with the NH bacterium, an anti-bacterial protein from the NH bacterium, one of the anti-bacterial compositions described herein, an anti-bacterial composition obtained by the methods described herein, or any combination thereof.

The term "food product" refers to a composition that can be ingested by humans or animals, including domesticated animals (e.g., dogs, cats), farm animals (e.g., cows, pigs, horses), and wild animals (e.g., non-domesticated predatory animals). This term also includes compositions that can be combined with or added to other ingredients to make compositions that can be ingested by humans or animals. In some embodiments, the food product is selected from the group consisting of a meat product (e.g., chicken, pork, beef, hot dog, frankfurter, deli meat), a dairy product (e.g., milk, cheese, ice cream), a seafood product, and a produce product.

Methods for Inhibiting Bacterial Growth in a Food Product:

In a fifth aspect, the present invention provides methods for inhibiting the growth of one or more bacteria in a food product. The methods comprise contacting the food product with an effective amount of a composition to inhibit the growth of the bacteria in the food product. The composition used in this method may comprise: the NH bacterium, an anti-bacterial protein from the NH bacterium, one of the anti-bacterial compositions described herein, an anti-bacterial composition obtained by the methods described herein, or any combination thereof.

Several methods of "contacting" may be used to apply an anti-bacterial composition described herein to a food product. For example, the anti-bacterial compositions may be mixed into, injected into, or applied to an exterior surface of a food product. The contacting step of the present methods may be carried out before or after the bacteria grows on the food product. The food product may be contacted 1, 2, 3, 4, 5, or more times with an anti-bacterial composition described herein. For example, the composition may be mixed into all or a portion of the ingredients used to make the food product or the composition may be sprayed onto the surface of the finished food product prior to packaging.

Inhibition of bacterial growth may be assessed using any method known in the art. Suitable methods include, for example, dilution plating, quantification of culture density (e.g., at 600 nm wavelength), and minimum inhibitory concentration measurements using microtiter plates.

"An effective amount to inhibit the growth of the bacteria" is an amount of an anti-bacterial composition that is sufficient to inhibit the growth of a bacteria by, for example, 10%, 20%, 50%, 75%, 80%, 90%, 95%, or 1-fold, 3-fold, 5-fold, 10-fold, 20-fold, or more compared to a negative control that does not comprise the NH bacterium or the anti-bacterial protein produced by the NH bacterium.

In some embodiments, the methods inhibit the growth of multiple species of bacteria. In the Examples, the inventors demonstrated that both the NH bacterium and protein precipitates produced by the NH bacterium can be used to inhibit the growth of *Campylobacter jejuni* and *Listeria monocytogenes* by up to 7 log colony forming units per milliliter (CFU/mL). Thus, in some embodiments, the one or more bacteria inhibited by the method comprises *Campylobacter jejuni* and/or *Listeria monocytogenes*. In specific embodiments, the methods reduce the growth of *Campylobacter jejuni* and/or *Listeria monocytogenes* by at least 2, 3, 4, 5, 6, or 7 log CFU/mL as compared to an untreated food product.

The methods of the present invention may be used to inhibit the growth of bacteria in any food product, including those described in the previous section. For example, in some embodiments, the food product is selected from the group consisting of a meat product, a dairy product, and a seafood product.

Pathogenic bacteria can be transmitted when food is harvested, processed, prepared, packed, transported, or stored in environments contaminated with the bacteria. Thus, in some embodiments, the method if performed during the processing, preparation, or packaging of the food product.

Methods for Disinfecting a Surface:

In a sixth aspect, the present invention provides methods for disinfecting a surface that has potentially been contaminated with one or more bacteria. The methods comprise contacting the surface with an effective amount of a composition to reduce the number of bacteria on the surface. The composition used in this method may comprise: the NH bacterium, an anti-bacterial protein from the NH bacterium, one of the anti-bacterial compositions described herein, an anti-bacterial composition obtained by the methods described herein, or any combination thereof.

As used herein, the term "disinfecting" refers to a process that reduces the number of bacteria (i.e., reduces the bacterial load) on a treated surface. Disinfection may be assessed by measuring or counting the number of bacteria on a surface following treatment.

The term "surface" refers to the outermost or uppermost layer of a physical object. In the Examples, the inventors demonstrate that the NH bacterium can be used to kill two food-borne pathogens. Thus, in some embodiments, the surface is a food contact surface. As used herein, a "food contact surface" is any surface that may come into contact with food products during their production, processing, and packaging. Exemplary food contact surfaces include surfaces found in food processing facilities, e.g., cutting tools, conveyor belts, food processing machines, and packaging materials. Food contact surfaces also include surfaces found in home kitchens, e.g., utensils, cutting boards, countertops, flatware, tables, and highchairs.

In some embodiments, the method reduces the number of multiple species of bacteria. In some embodiments, the method reduces the number of *Campylobacter jejuni* and/or *Listeria monocytogenes*.

"An effective amount to reduce the number of bacteria" is an amount of an anti-bacterial composition that is sufficient to reduce the number of a bacteria by, for example, 10%, 20%, 50%, 75%, 80%, 90%, 95%, or 1-fold, 3-fold, 5-fold, 10-fold, 20-fold, or more compared to a negative control that does not comprise the NH bacterium or the anti-bacterial protein produced by the NH bacterium.

The present disclosure is not limited to the specific details of construction, arrangement of components, or method steps set forth herein. The compositions and methods disclosed herein are capable of being made, practiced, used, carried out and/or formed in various ways that will be apparent to one of skill in the art in light of the disclosure that follows. The phraseology and terminology used herein is for the purpose of description only and should not be regarded as limiting to the scope of the claims. Ordinal indicators, such as first, second, and third, as used in the description and the claims to refer to various structures or method steps, are not meant to be construed to indicate any specific structures or steps, or any particular order or configuration to such structures or steps. All methods described herein can be performed in any suitable order unless otherwise indicated herein or otherwise clearly contradicted by context. The use of any and all examples, or exemplary language (e.g., "such as") provided herein, is intended merely to facilitate the disclosure and does not imply any limitation on the scope of the disclosure unless otherwise claimed. No language in the specification, and no structures shown in the drawings, should be construed as indicating that any non-claimed element is essential to the practice of the disclosed subject matter. The use herein of the terms "including," "comprising," or "having," and variations thereof, is meant to encompass the elements listed thereafter and equivalents thereof, as well as additional elements. Embodiments recited as "including," "comprising," or "having" certain elements are also contemplated as "consisting essentially of" and "consisting of" those certain elements.

Recitation of ranges of values herein are merely intended to serve as a shorthand method of referring individually to each separate value falling within the range, unless otherwise indicated herein, and each separate value is incorporated into the specification as if it were individually recited herein. For example, if a concentration range is stated as 1% to 50%, it is intended that values such as 2% to 40%, 10% to 30%, or 1% to 3%, etc., are expressly enumerated in this specification. These are only examples of what is specifically intended, and all possible combinations of numerical values between and including the lowest value and the highest value enumerated are to be considered to be expressly stated in this disclosure. Use of the word "about" to describe a particular recited amount or range of amounts is meant to indicate that values very near to the recited amount are included in that amount, such as values that could or naturally would be accounted for due to manufacturing tolerances, instrument and human error in forming measurements, and the like. All percentages referring to amounts are by weight unless indicated otherwise.

No admission is made that any reference, including any non-patent or patent document cited in this specification, constitutes prior art. In particular, it will be understood that, unless otherwise stated, reference to any document herein does not constitute an admission that any of these documents forms part of the common general knowledge in the art in the United States or in any other country. Any discussion of the references states what their authors assert, and the applicant reserves the right to challenge the accuracy and pertinence of any of the documents cited herein. All references cited herein are fully incorporated by reference, unless explicitly indicated otherwise. The present disclosure shall control in the event there are any disparities between any definitions and/or description found in the cited references.

The following examples are meant only to be illustrative and are not meant as limitations on the scope of the invention or of the appended claims.

EXAMPLES

Example 1

In the following example, the inventors describe their discovery and characterization of a sporulating bacterium, designated NH, that was isolated from poultry fecal material and exhibited bactericidal control of the food-borne pathogens *Listeria monocytogenes* and *Campylobacter jejuni*.

Methods:

The NH bacterium was isolated on starch agar from a microaerophilic culture of rooster cecal droppings. The 16s ribosomal gene V4 region was amplified via conventional PCR and sequenced in both directions (Eurofins). Gel filtration chromatography was performed using BioGel P60 (BioRad Laboratories). The activity assay was a MIC assay read on a plate reader (Tecan). Ultrafiltration was performed with 10 kDa and 30 kDa MWCO devices (Millipore). Cation exchange, anion exchange, and isoelectric focusing were performed on SP-sepharose, Q-sepharose (GE healthcare), and MicroRotofor cell (BioRad), respectively. SDS-PAGE was performed with the Mini-Protean Tetra Cell (BioRad). Mass spectrometry was performed at the MS facility, University of Arkansas.

Figure 1:
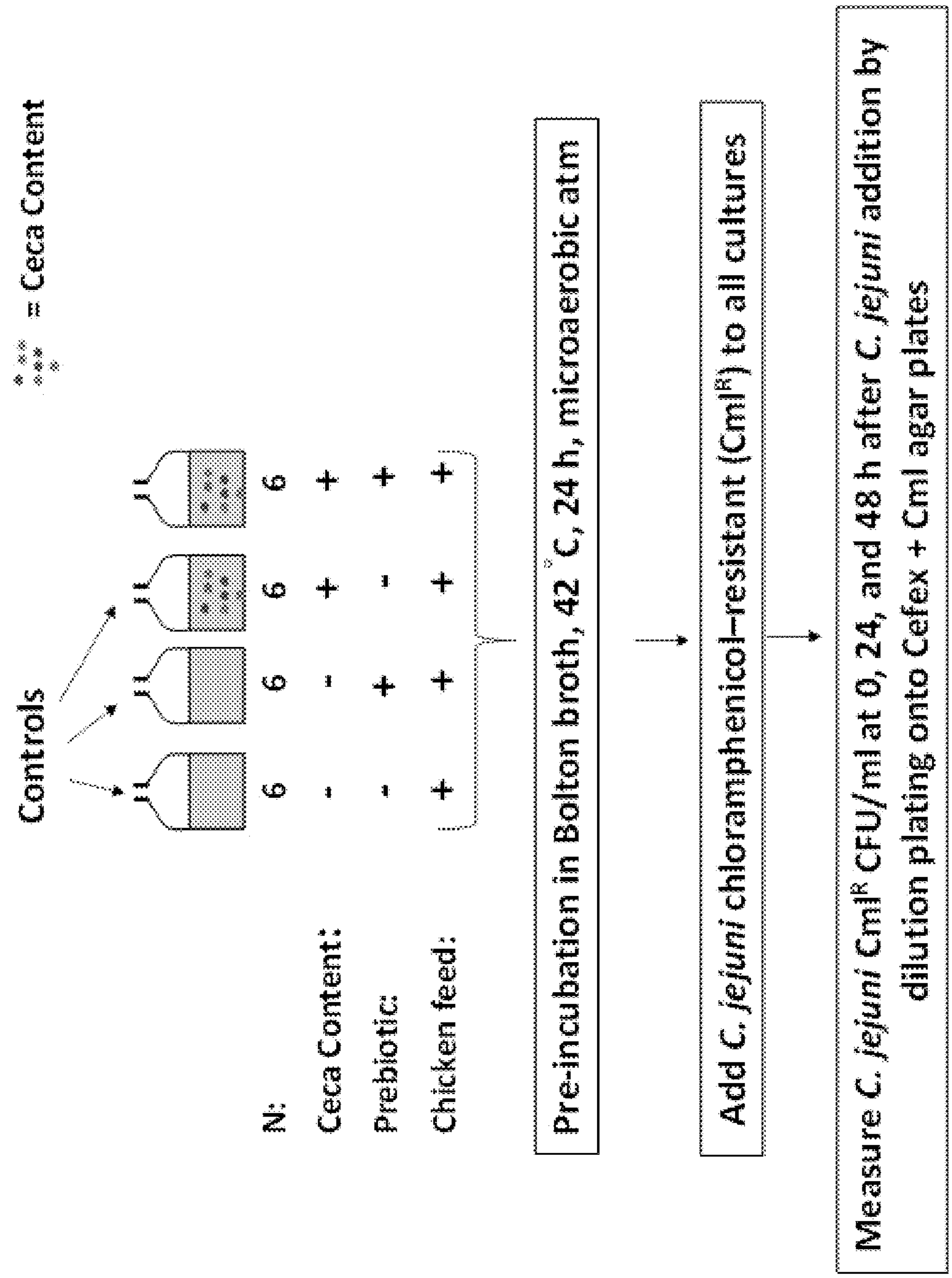
FIG. 1 is a schematic depiction of the in vitro system used to test prebiotics for the ability to inhibit the growth of *Campylobacter jejuni*. In this system, the contents of the cecum (hindgut) of chickens, chicken feed, and the prebiotic to be tested are incubated under microaerobic conditions. *C. jejuni* is added to the mixture, and the amount of *C. jejuni* is measured after incubations of various lengths. This arrangement is designed to approximate the conditions within the lower intestinal tract of the chicken.

Results:

In our previous publications, we described an in vitro model system for testing of prebiotics (Rubinelli et al., 2016; Park et al., 2017; Kim et al., 2019). A prebiotic is a substance that is not readily digestible by the host animal but that can be utilized by microorganisms in the lower intestinal tract, resulting in a competitive advantage to beneficial microorganisms over pathogens. In our system, the contents of the cecum (hindgut) of chickens are added to a redox indicator buffer and chicken feed along with the prebiotic to be tested and incubated under an anaerobic atmosphere in air-tight serum bottles. This arrangement is designed to approximate the conditions within the lower intestinal tract of the chicken. We have recently further modified this system for the testing for prebiotics and probiotics that can control *Campylobacter*. *Campylobacter* is a microaerophilic bacterium that requires an oxygen concentration of 3-15%. Thus, the system was modified by replacing the completely anaerobic atmosphere with a gas mixture that is microaerobic (5% oxygen/10% carbon dioxide/85% nitrogen) and by replacing the redox indicator buffer with a liquid medium that supports the growth of *Campylobacter* (Bolton broth). A diagram of the methodology is shown in FIG. 1.

While testing prebiotics in this modified microaerophilic system, we identified a species of bacteria that is bactericidal towards *Campylobacter jejuni*. As part of the enumeration of *Campylobacter* from these cultures, the culture was spread on an agar plate that normally supports only *Campylobacter* (Cefex agar). We observed unusual colonies on these agar plates and when further isolation of the colonies was performed, one of the isolates was found to be composed primarily of an endospore-forming bacterium, but also contained small numbers of stationary-phase *Campylobacter*. This isolate was given the name NH for its starch non-hydrolyzing behavior on starch agar. 16s ribosomal gene sequencing (i.e., of the V4 region of the 16s ribosomal gene) was used to identify the bactericidal bacterium as a member of the Paenibacillaceae family. This field isolate of bacteria was then purified and isolated by repeated streaking on agar plates and cryo-preserved.

Figure 2:
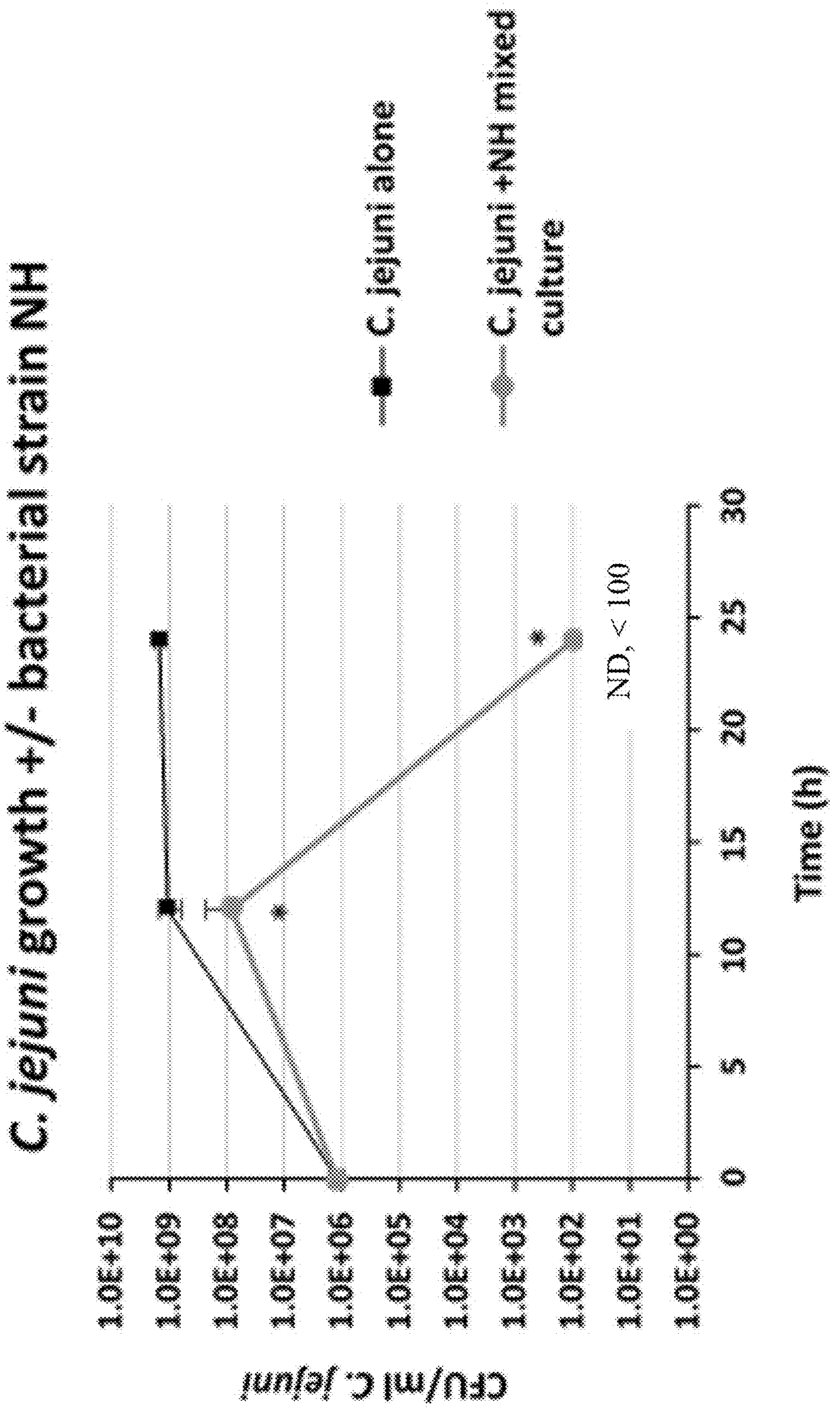
FIG. 2 is a graph showing the growth of *C. jejuni* in cultures with and without strain NH. ND: none detected (i.e., below the 100 CFU/ml limit of detection). Asterisks indicate a significant difference of the means at the same time point (two-tailed t-test, $P<0.05$). n=6.
Figure 3:
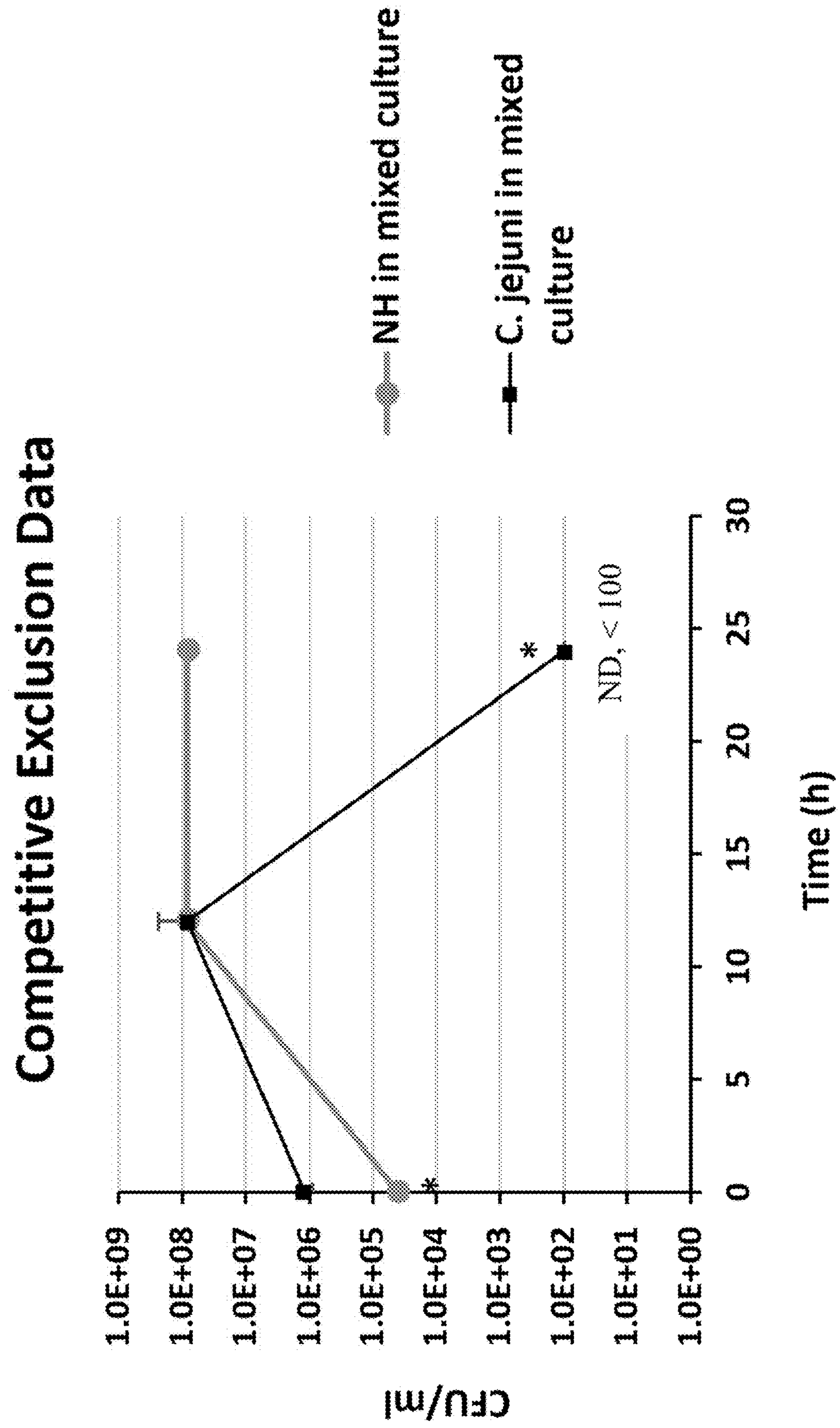
FIG. 3 is a graph comparing the growth of *C. jejuni* to the growth of strain NH after 0, 12, and 24 hours of co-culture. ND: none detected (i.e., below the 100 CFU/ml limit of detection). Asterisks indicate a significant difference of the means at the same time point (P<0.05, two-tailed t-test). *C. jejuni* levels were below the detection limit in the mixed cultures at 24 hours. n=6.

Subsequent testing of the bacterium in co-culture with *Campylobacter* demonstrated that the bacterium is an effective antagonist of *Campylobacter* and appeared to be much more effective at controlling *Campylobacter jejuni* than most probiotics and vaccines described in the scientific literature. The cultures with the bacterium exhibited a 7-log reduction in *Campylobacter jejuni* numbers compared to the control cultures without the bacterium isolate (FIGS. 2 and 3). This log reduction is comparable to the best vaccines that have been reported in the literature (Wyszyńska et al., 2004; Nothaft et al., 2016).

Figure 4:
FIG. 4 is a photograph showing control of *C. jejuni* by precipitated protein from a cell-free filtrate of strain NH culture. Bactericidal action on *C. jejuni* can be seen as a lack of turbidity in wells containing the active protein fractions (20-40% and 40-60%). CON: control wells containing only *C. jejuni* cells, *Campylobacter* growth medium, and the same buffer used to dialyze the protein precipitates to remove the salt. Percentages refer to the concentration of ammonium sulfate used to precipitate the proteins. Three technical replicates were performed for each treatment, as indicated by the lines above the photo. The protein was diluted in *Campylobacter* growth medium by 1:2 serial dilution down the microtiter plate, from top to bottom, just prior to addition of the *C. jejuni* cells. The photo was taken 48 hours post-inoculation with *Campylobacter*.
Figure 5:
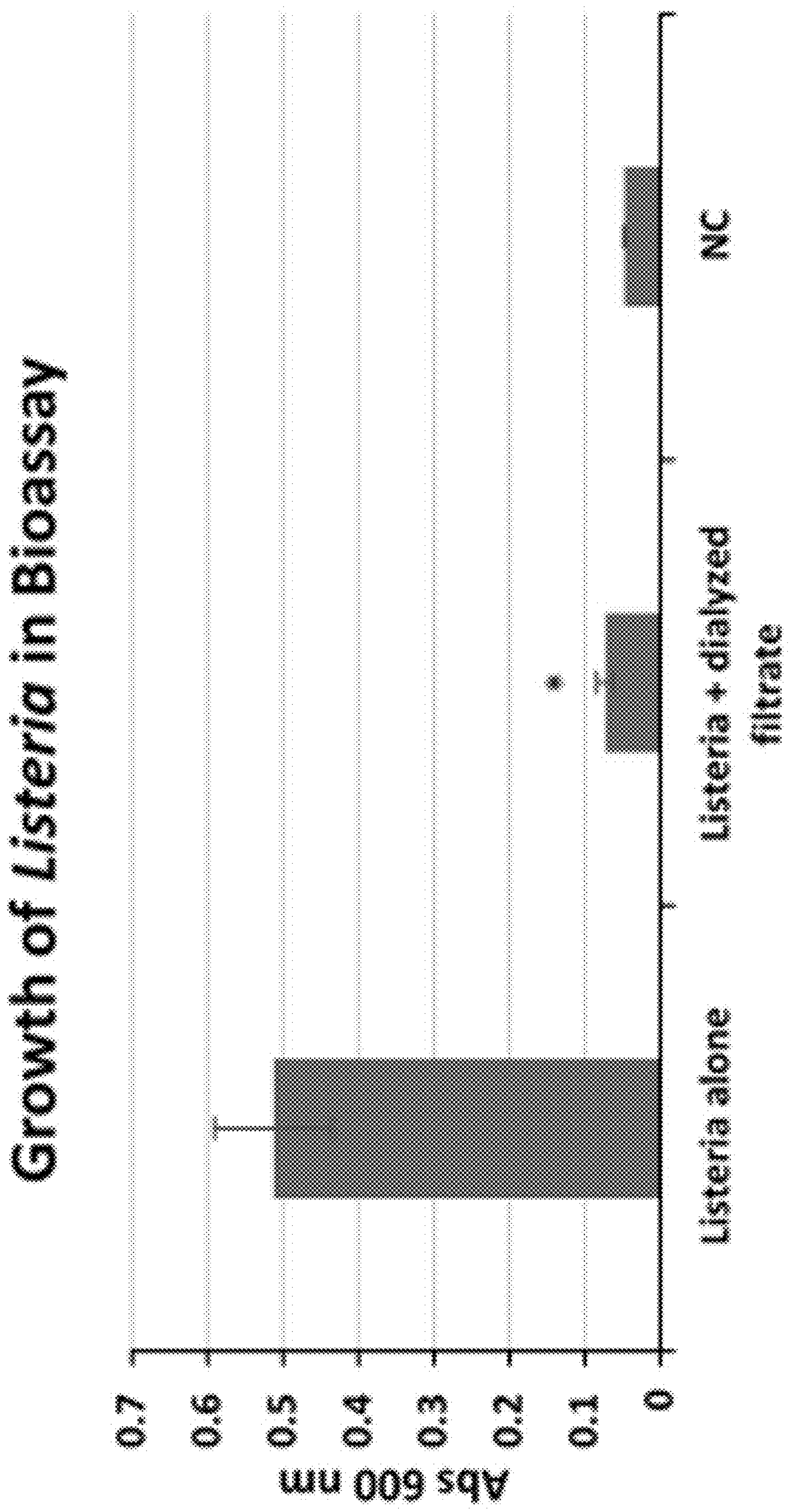
FIG. 5 is a graph showing control of *Listeria monocytogenes* by a precipitated protein from cell-free filtrate of strain NH culture. This experiment was performed as described in FIG. 4, and the *L. monocytogenes* culture density was quantified at 600 nm wavelength. Bars and brackets represent the mean and standard deviation of 3 technical replicates. The asterisk indicates a significant difference of the dialyzed filtrate compared to the *Listeria*-only treatment (two-tailed t-test, P<0.05). NC: negative control treatment containing only growth medium and the same buffer used to dialyze the strain NH culture filtrate.
Figure 6:
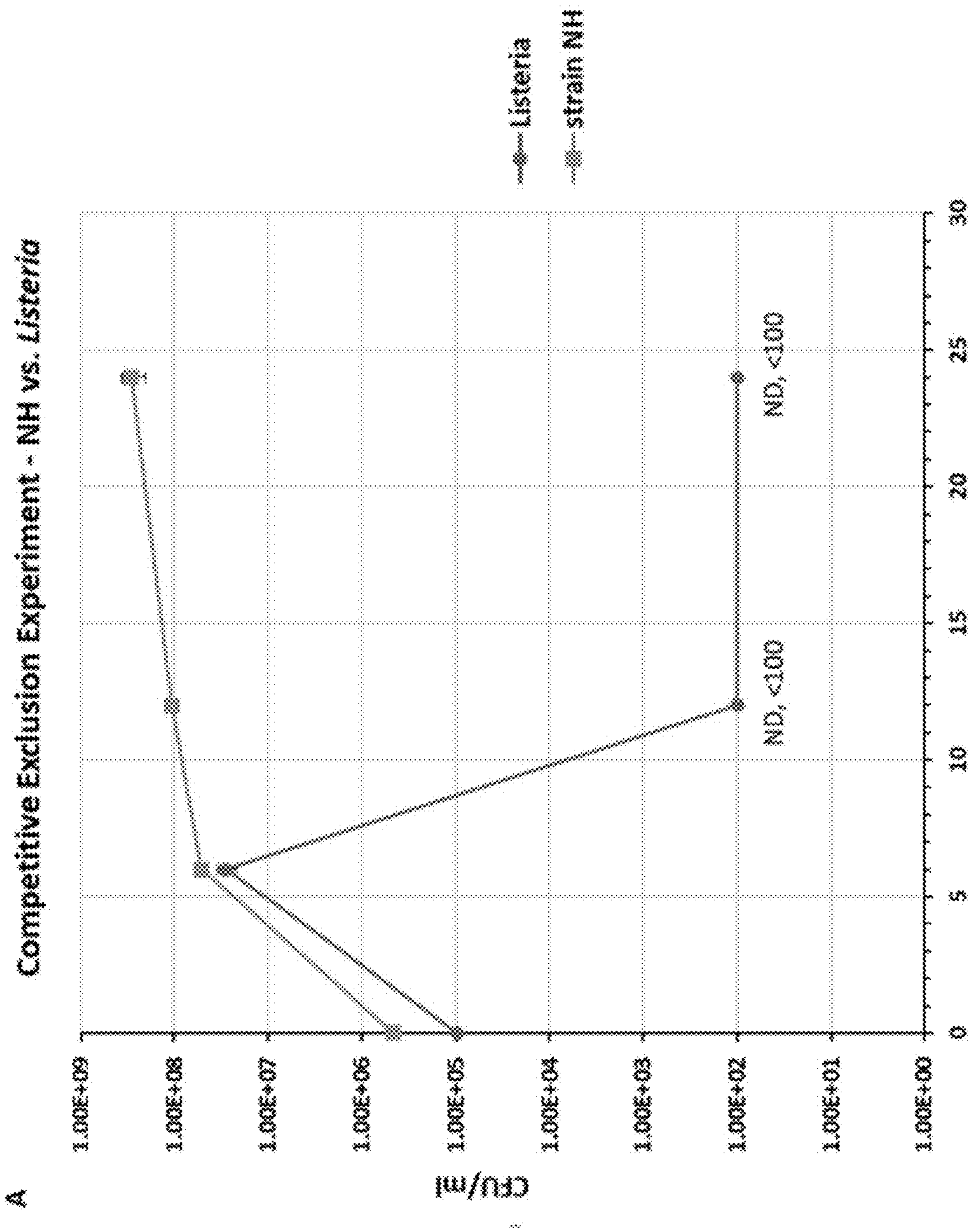
FIG. 6 is a graph showing control of *L. monocytogenes* by whole cells of strain NH. (A) Trial 1. Co-culture of strain NH and *L. monocytogenes*. The number of *L. monocytogenes* at 12 and 24 hours was below the limit of detection (ND: none detected, <100 CFU/ml), so the number was represented as 100 CFU/ml to allow plotting. n=6. (B) Trial 2. Control cultures containing *L. monocytogenes* alone and strain NH alone were included in the experiment for comparison, and NH was deliberately underrepresented in the initial inoculum for proof of concept. n=4.
Figure 6:
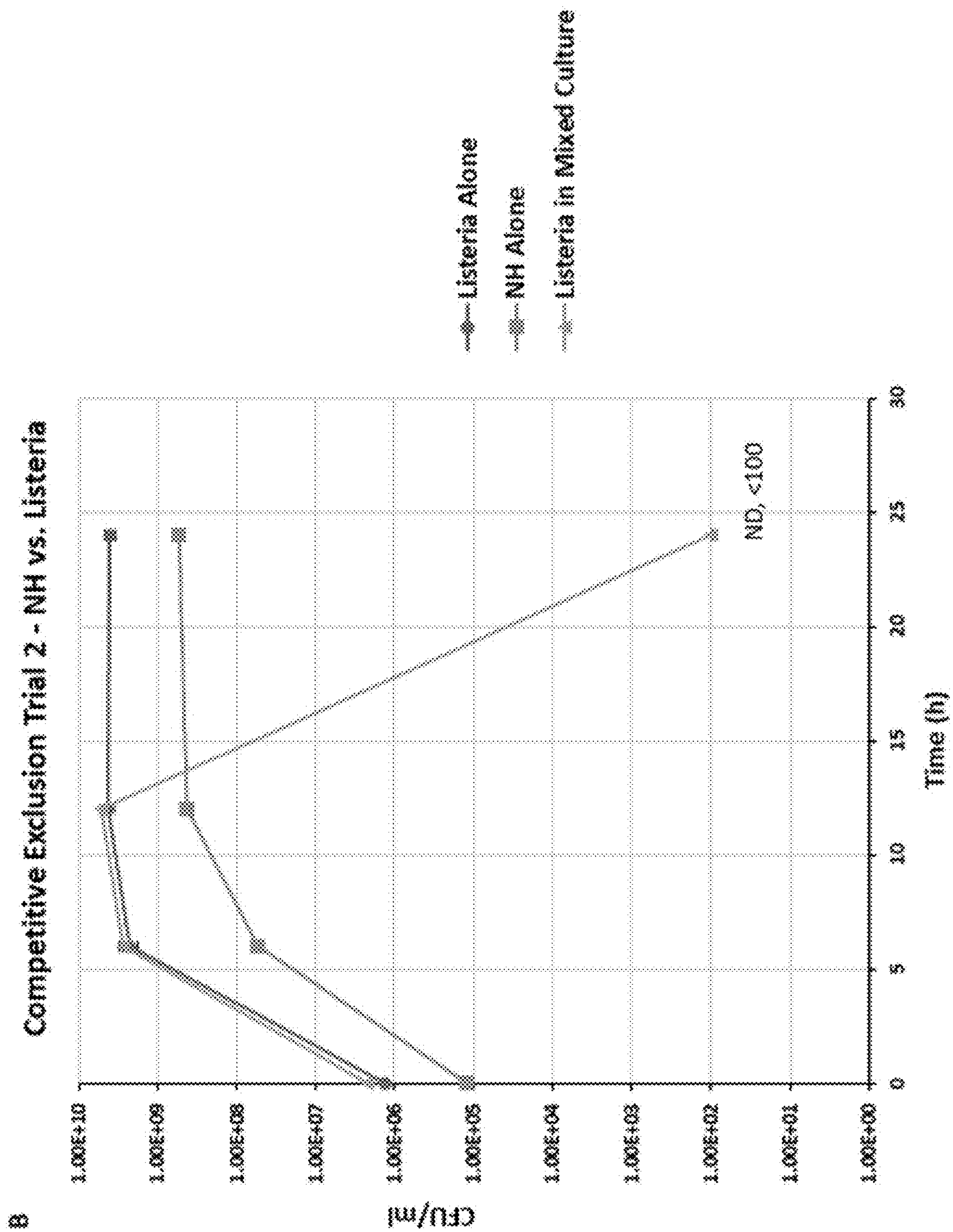

A cell-free filtrate of the bacterial culture was treated with ammonium sulfate to precipitate proteins and was then dialyzed to remove the salt. When this partially purified protein was added to fresh *Campylobacter* culture medium, it completely prevented the *Campylobacter* from growing, suggesting that the NH bacterium controls *Campylobacter* via secretion of a protein into the medium that kills or otherwise inhibits the growth of *Campylobacter* (FIG. 4). We further demonstrated that both the NH cell-free filtrate protein precipitate (FIG. 5) and NH whole cells (FIG. 6) can effectively control *Listeria monocytogenes*, a foodborne bacterial pathogen of concern in the food industry.

Figure 7:
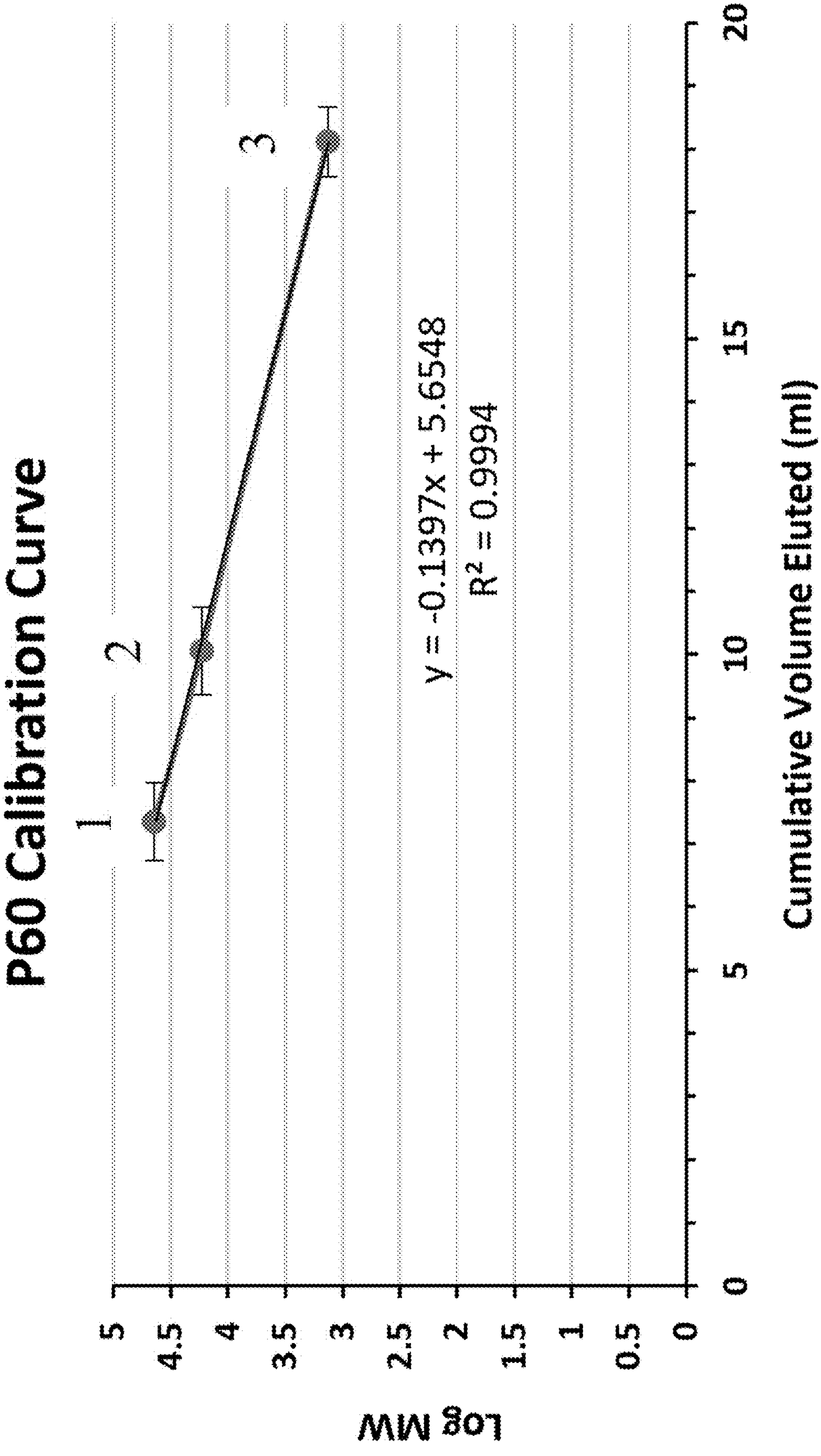
FIG. 7 shows a size exclusion chromatography (BioGel P60) standard curve and estimate of the molecular weight of the bactericidal protein. Standard 1: chicken ovalbumin (44 kDa); standard 2: horse myoglobin (17 kDa); standard 3: vitamin B12 (1,350 Dal). Brackets represent ±1 standard deviation of the mean. n=3. The elution volume of the bactericidal protein was 6.81 ml, corresponding to a molecular weight of 50.5 kDa.

Size determination by gel filtration chromatography indicated a size of approximately 50 kDa for the active secreted substance (FIG. 7). Following ultrafiltration, only minimal activity passed through 30 kDa MWCO, and was fully retained by 10 kDa MWCO. The bactericidal activity bound strongly to a cation exchange resin but only minimally to anion exchange resin in the pH range 4.5-8.5. Isoelectric focusing indicated an isoelectric point of 10.6 for the cationic substance. The bactericidal activity in the crude dialysate is sensitive to both trypsin and lysozyme, but not to catalase. SDS-PAGE indicated that a second ~11 kDa protein was enriched in the active fraction from the cation exchange column. Mass spectrometry of this protein indicated peptide similarity to a protein involved in regulation of flagellar biosynthesis. We hypothesize that the two detected anti-bacterial proteins, i.e., the 50 kDa protein and the 11 kDa protein, are two different components of the bactericidal activity of the NH bacterium. It is possible that these components are unrelated to each other or are interacting in some way.

The 50 kDa protein has been partially purified through ammonium sulfate precipitation and two different ion exchange resin treatments (Table 1).

TABLE 1

Purification results

| Purification Step | Total Protein (mg) | Total Activity[1] (AU) | Total Specific Activity (AU/mg) | Yield (%)[2] |
|---|---|---|---|---|
| Culture filtrate | 12013.90 | 5730.00 | 0.48 | 100.00 |
| 60% AS precip. | 112.18 | 5472.00 | 48.78 | 95.50 |
| anion exch., pH 8.5 | 5.34 | 1094.40 | 205.13 | 19.10 |
| cation exch., pH 7.0 | 1.42 | 547.20 | 384.62 | 9.55 |

[1]Total activity = (bioassay endpoint DF)/(proportion of total volume of extract plated in bioassay)
[2]Yield = (total activity of purification step/initial total activity) × 100

REFERENCES

Khelissa, S., Chihib, N.-E., and Gharsallaoui, A. (2021). Conditions of nisin production by *Lactococcus lactis* subsp. *lactis* and its main uses as a food preservative. *Arch. Microbiol.* 203, 465-480. doi:10.1007/s00203-020-02054-z.

Kim, S. A., Jang, M. J., Kim, S. Y., Yang, Y., Pavlidis, H. O., and Ricke, S. C. (2019). Potential for prebiotics as feed additives to limit foodborne *Campylobacter* establishment in the poultry gastrointestinal tract. *Front. Microbiol.* 10, 91-91. doi:10.3389/fmicb.2019.00091.

Nothaft, H., Davis, B., Lock, Y. Y., Perez-Munoz, M. E., Vinogradov, E., Walter, J., et al. (2016). Engineering the *Campylobacter jejuni* N-glycan to create an effective chicken vaccine. *Sci. Rep.* 6, 26511.

Park, S. H., Kim, S. A., Lee, S. I., Rubinelli, P. M., Roto, S. M., Pavlidis, H. O., et al. (2017). Original XPC™ effect on *Salmonella Typhimurium* and cecal microbiota from three different ages of broiler chickens when incubated in an anaerobic in vitro culture system. *Front. Microbiol.* 8, 1070. doi:10.3389/fmicb.2017.01070.

Rubinelli, P., Roto, S., Kim, S. A., Park, S. H., Pavlidis, H. O., McIntyre, D., et al. (2016). Reduction of *Salmonella Typhimurium* by fermentation metabolites of Diamond V Original XPC in an in vitro anaerobic mixed chicken cecal culture. *Front. Vet. Sci.* 3, 83. doi:10.3389/fvets.2016.00083.

Wyszyńska, A., Raczko, A., Lis, M., and Jagusztyn-Krynicka, E. K. (2004). Oral immunization of chickens with avirulent *Salmonella* vaccine strain carrying *C. jejuni* 72Dz/92 cjaA gene elicits specific humoral immune response associated with protection against challenge with wild-type *Campylobacter. Vaccine* 22, 1379-1389. doi:https://doi.org/10.1016/j.vaccine.2003.11.001.

Example 2

In the following example, the inventors describe experiments that were performed to identify and further characterize the strain NH bacterium and the secreted bactericidal protein.

Purification of the Bactericidal Protein

Figure 8:
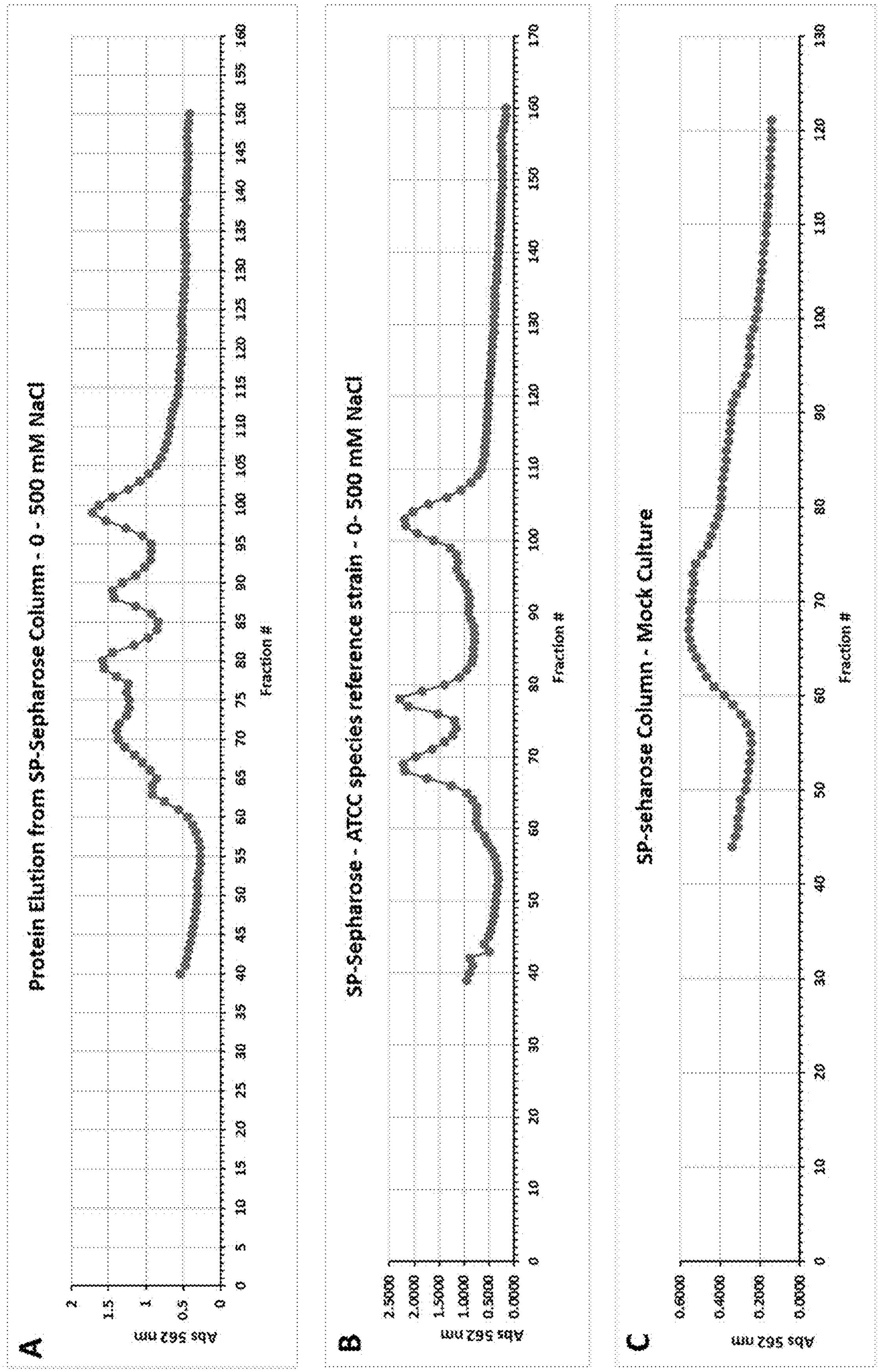
FIG. 8 shows salt gradient elution profiles (0-500 mM NaCl) from the cation exchange column of (A) strain NH, (B) species reference strain ATCC 12856 (*Aneurinibacillus. aneurinilyticus*), and (C) a mock inoculation of same growth medium (Bolton broth) containing no bacteria.
Figure 9:
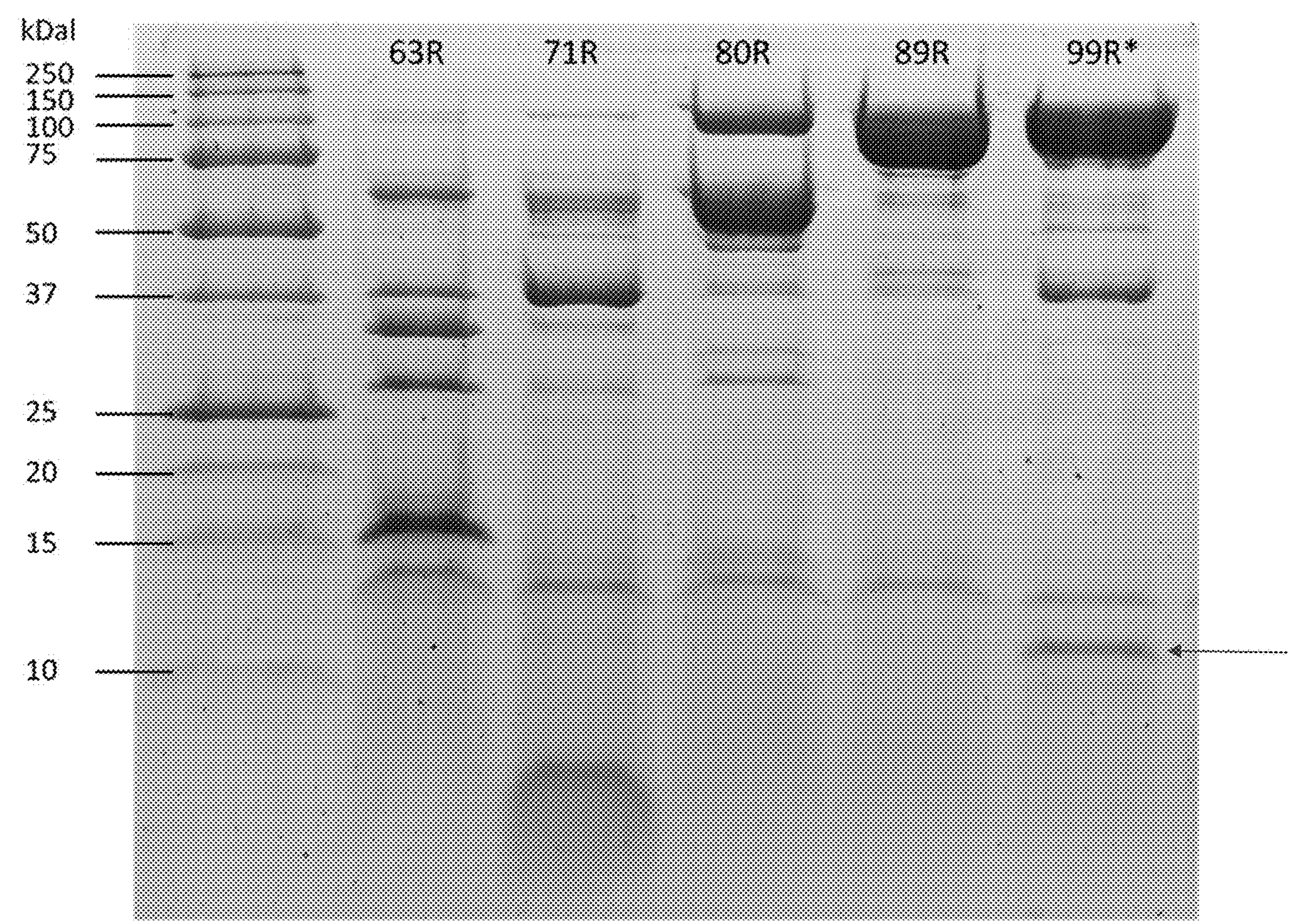
FIG. 9 shows the results of (A) a bioassay and (B) SDS-PAGE performed with 10 mg/lane of protein peaks from the cation exchange column. The values shown in panel A are the absorbance of the culture at 600 nm wavelength and are directly proportional to *C. jejuni* growth. Wells that showed inhibition of *C. jejuni* growth are highlighted in yellow. The asterisk indicates the active (bactericidal) peak. The arrow points to the enriched band of the active fraction. D=dialysate of ammonium sulfate-precipitated cell-free culture supernatant. CF=cell-free culture filtrate prior to ammonium sulfate precipitation. R=retentate from ultrafiltration of column peak fractions (desalted fractions). PC=positive control containing *C. jejuni* cells+media+buffer, but no protein fraction. NC=negative control containing media+buffer, but no *C. jejuni* cells.
Figure 10:
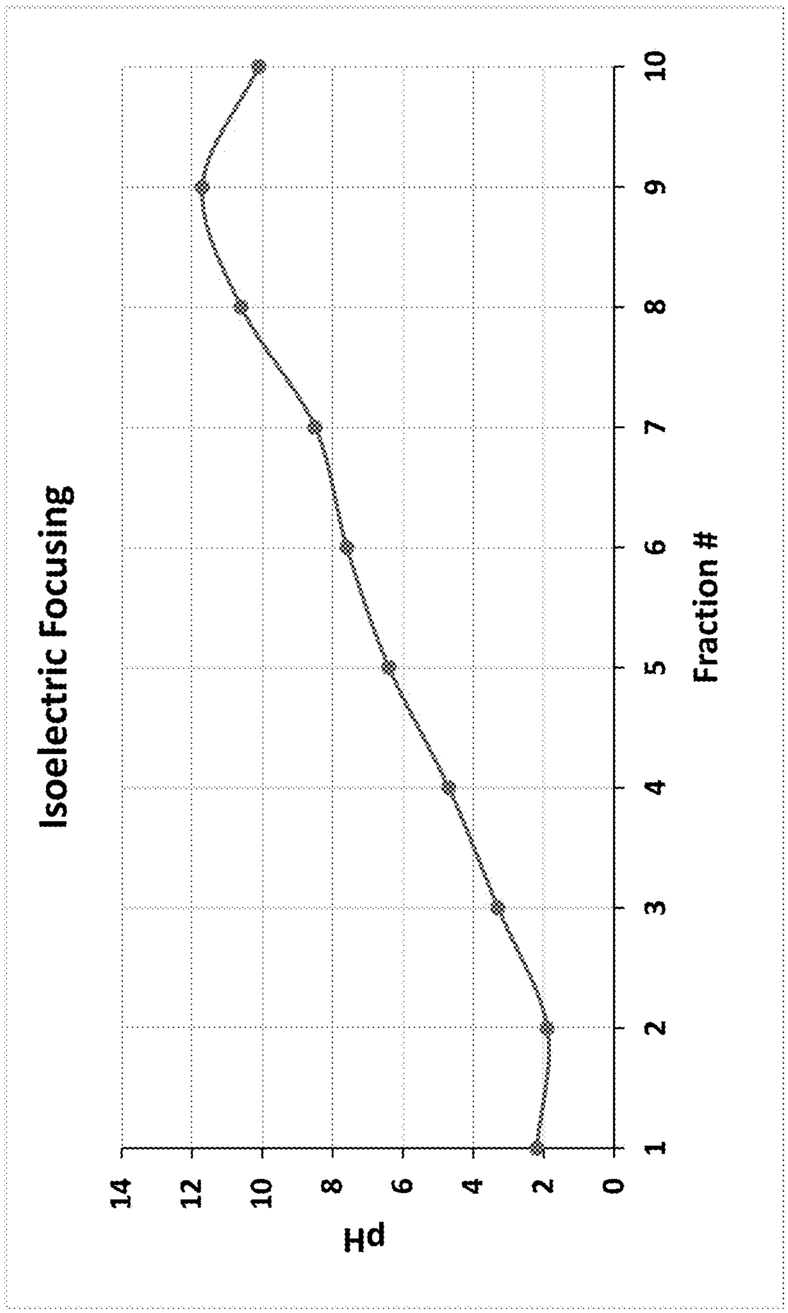
FIG. 10 shows the results of a first isoelectric focusing (IEF) experiment performed against *C. jejuni*. (A) Minimum inhibitory concentration (MIC) bioassay results for dialysate and IEF fractions. (B) pH of IEF fractions. Only fraction 8 had the bactericidal activity, as evidenced by the results shown in panel A. (C) SDS-PAGE of dialysate (lane 1), active peak from cation exchange column (lane 2), and isoelectric focusing fractions 8, 5, 6, and 7 (lanes 3-6, respectively). The abbreviations are the same as in FIG. 9.
Figure 10:
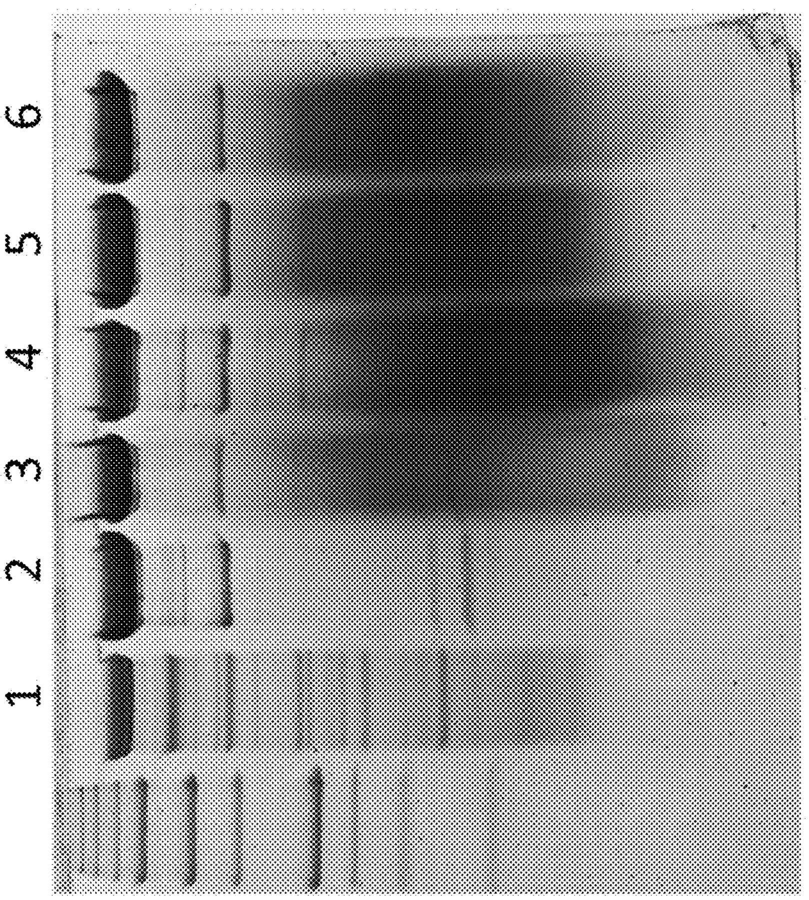
Figure 11:
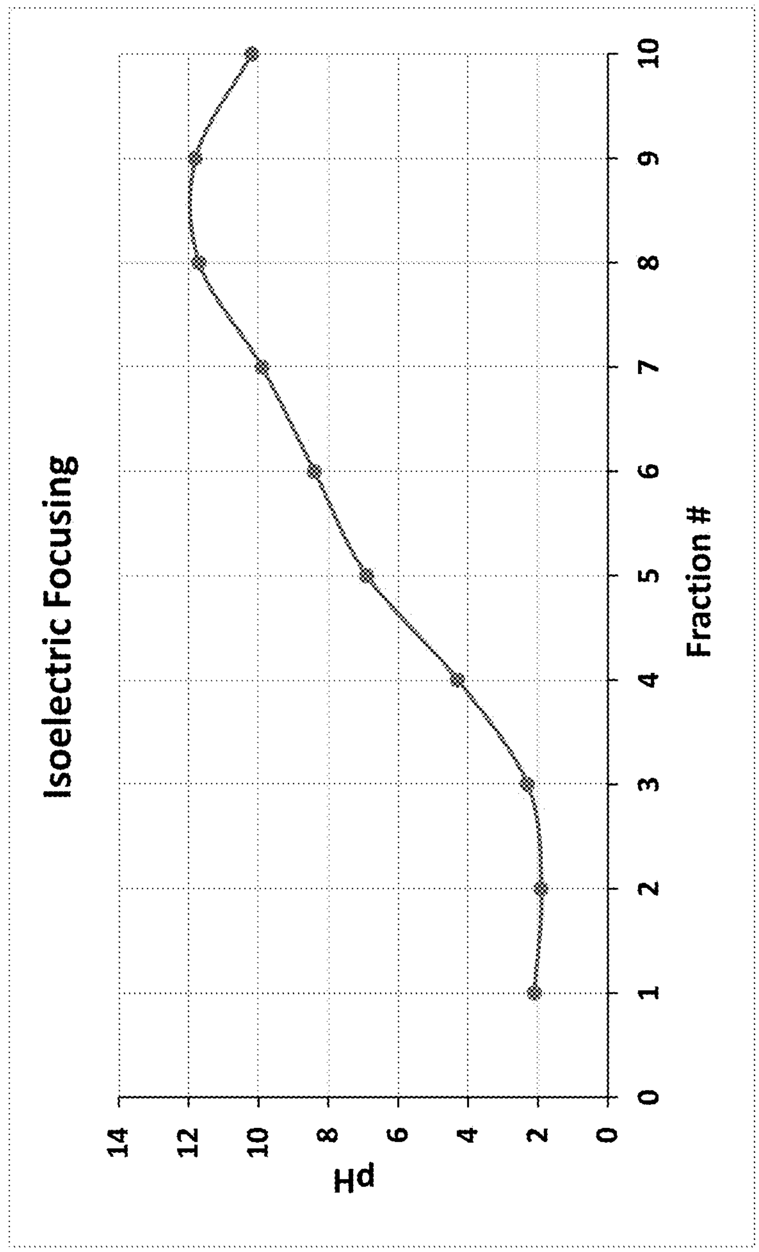
FIG. 11 shows the results of a second IEF experiment performed against *L. monocytogenes*. (A) MIC bioassay results for dialysate and IEF fractions. (B) pH of IEF fractions. (C) SDS-PAGE of active peak from cation exchange column (starting material for IEF, lane 1) and IEF fractions 5, 6, 7, 2, 3, 4, and 9 (lanes 2-8, respectively). The abbreviations are the same as in FIG. 9.
Figure 11:
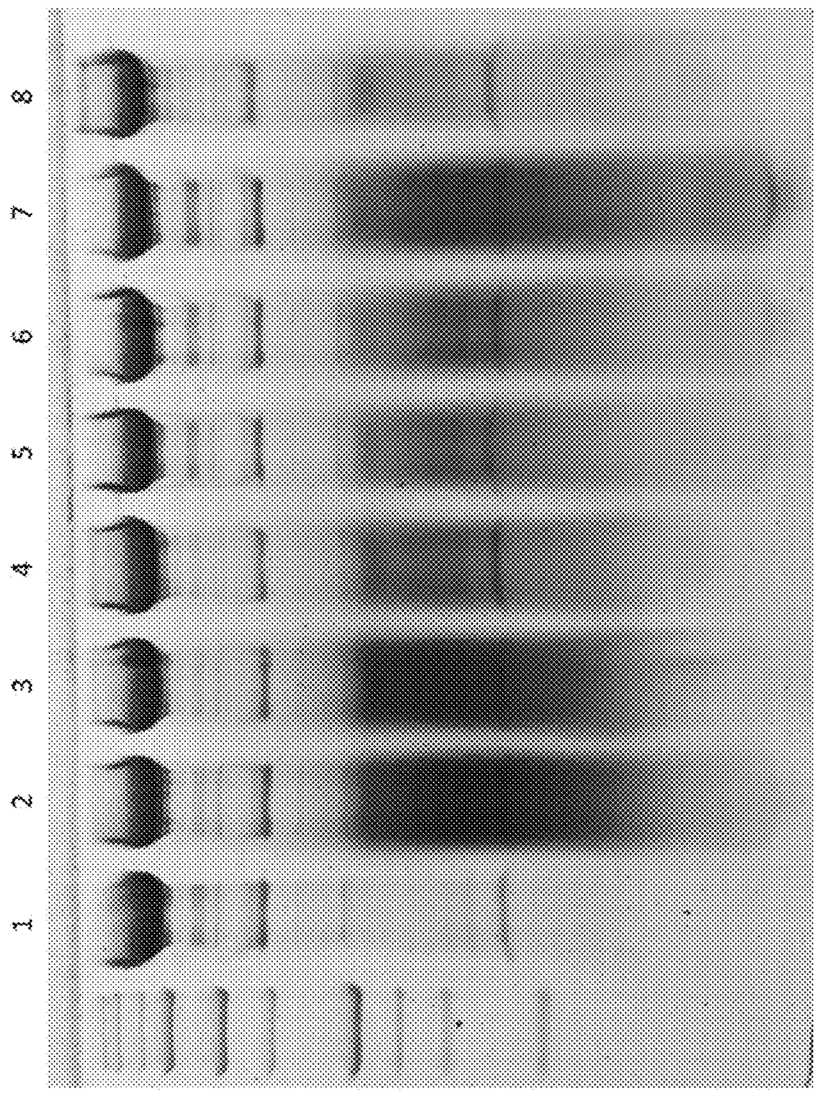

The bactericidal protein was identified by comparing inactive and active fractions from the cation exchange column (FIG. 8A). Sodium dodecyl sulfate-polyacrylamide gel electrophoresis (SDS-PAGE) was used to identify a 12 kDa band that was enriched in the active fraction from the column (FIG. 9, arrow). This band was also enriched in the active fractions from isoelectric focusing (IEF) against *Campylobacter jejuni*, as shown in FIG. 10 and FIG. 11. Of the 10 IEF fractions, only fraction 8 had bactericidal activity against *Campylobacter jejuni* (FIG. 10A), and this fraction also exhibited enrichment of the identified band (FIG. 10C). The isoelectric point (i.e., the pH at which the protein has no net electrical charge, abbreviated "pI") was indicated by this experiment to be 10.6 (FIG. 10B).

In a second IEF experiment that used *L. monocytogenes* as the bioassay target, the concentration of the active protein was greater following IEF (FIG. 11A), and was detected in more than one fraction, but fraction 7 had the greatest activity. Interestingly, fraction 7 did not have the highest overall protein concentration compared to other IEF fractions (FIG. 11A). This indicates that the active protein is enriched in this fraction and that the increased activity of this fraction is not simply the result of greater protein quantity. Overall, the IEF experiments demonstrate that the pI of the active protein is approximately 10, and SDS-PAGE of the IEF fractions from the second experiment confirm an enrichment of the 12 kDa band (FIG. 11C). Therefore, we conclude that the bactericidal protein has a net positive electrical charge, consistent with the fact that it binds strongly to a cation exchange column, and that it has a subunit that is approximately 12 kDa in size. Previously, we found that the native size of the bactericidal protein is considerably larger (~50 kDa) by gel filtration chromatography, which suggests that the bactericidal protein forms a multi-subunit complex in its native form that is disrupted and denatured by SDS-PAGE.

The IEF data also suggest that the same protein that controls *Campylobacter* (Gram negative) also controls *Listeria* (Gram positive). Thus, this protein has an unusually wide bactericidal spectrum and potentially represents a novel antibacterial mode of action.

Figure 12:
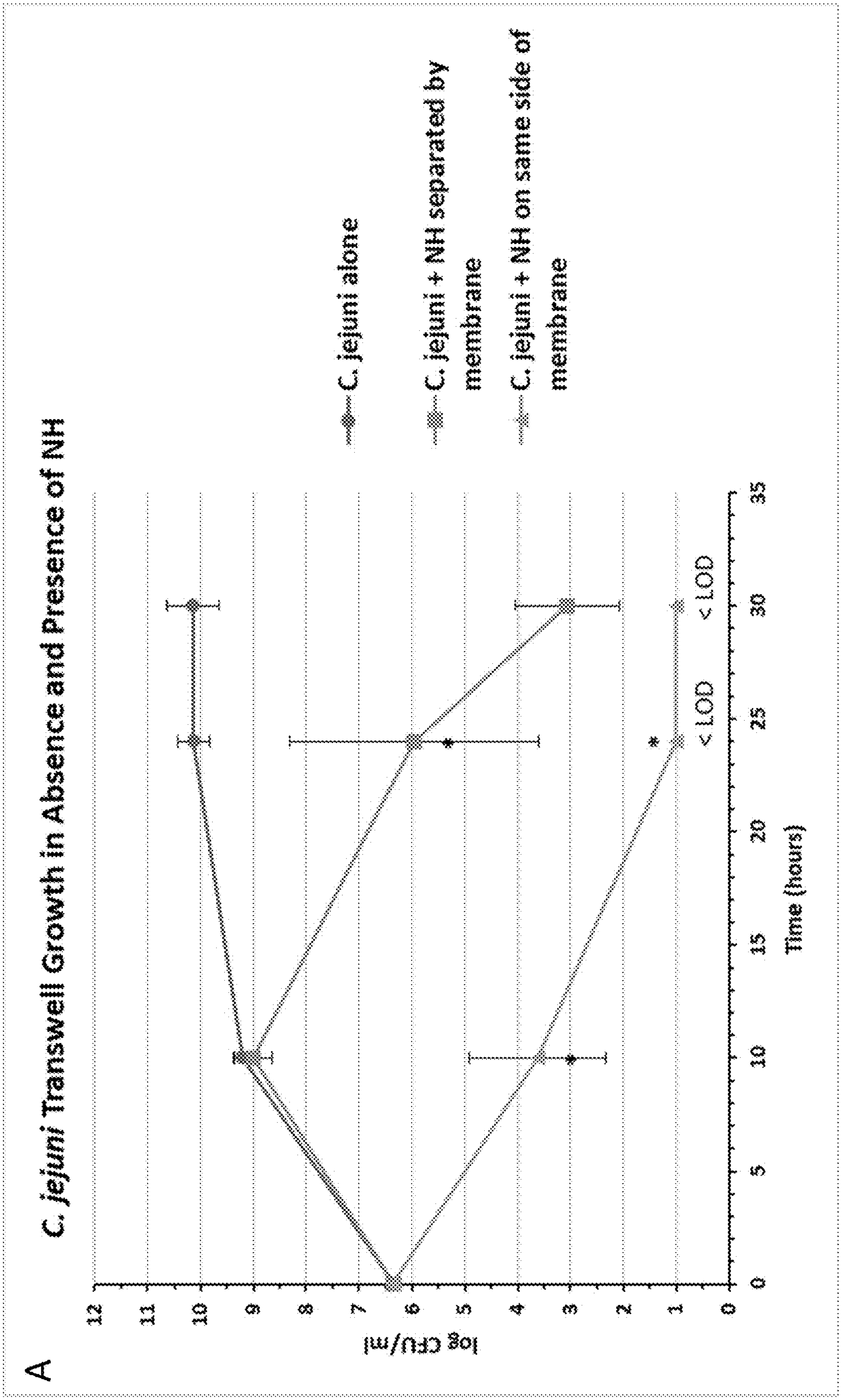
FIG. 12 shows graphs that demonstrate that co-culture with strain NH in a transwell plate inhibits *C. jejuni* cell growth. (A) Growth of *C. jejuni* alone and in mixed culture in transwell culture plates grown under microaerobic conditions (5% oxygen). The inner and outer chambers of the transwell plates are separated by a 0.4 mm membrane filter. (B) Control experiment that was run in parallel, which demonstrates that strain NH is unable to cross the membrane. Data points and brackets represent the mean and standard deviation of the mean of three independent experiments, respectively. Means marked with an asterisk (*) were significantly different from the *C. jejuni* alone data at the same time point (P<0.05). "<LOD"=below the limit of detection.
Figure 12:
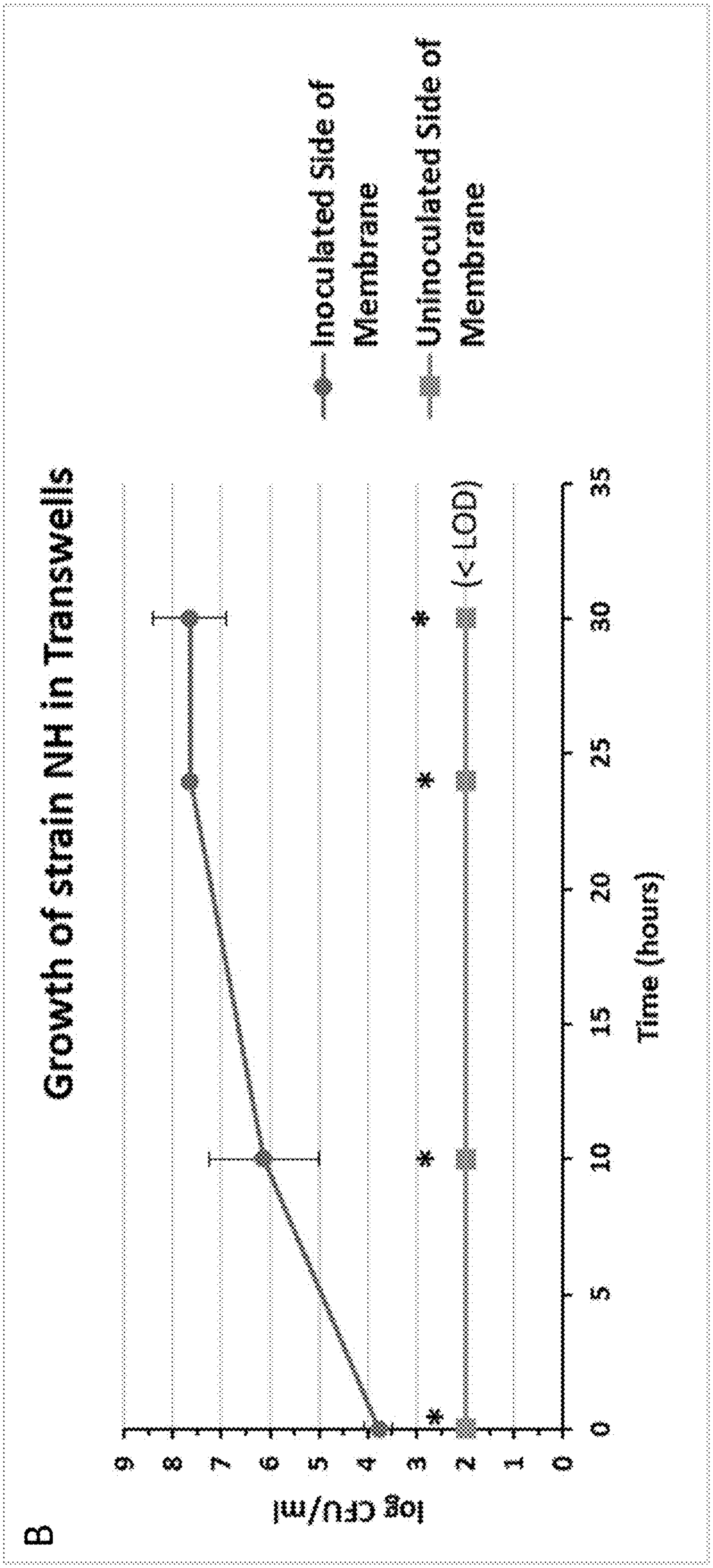
Figure 13:
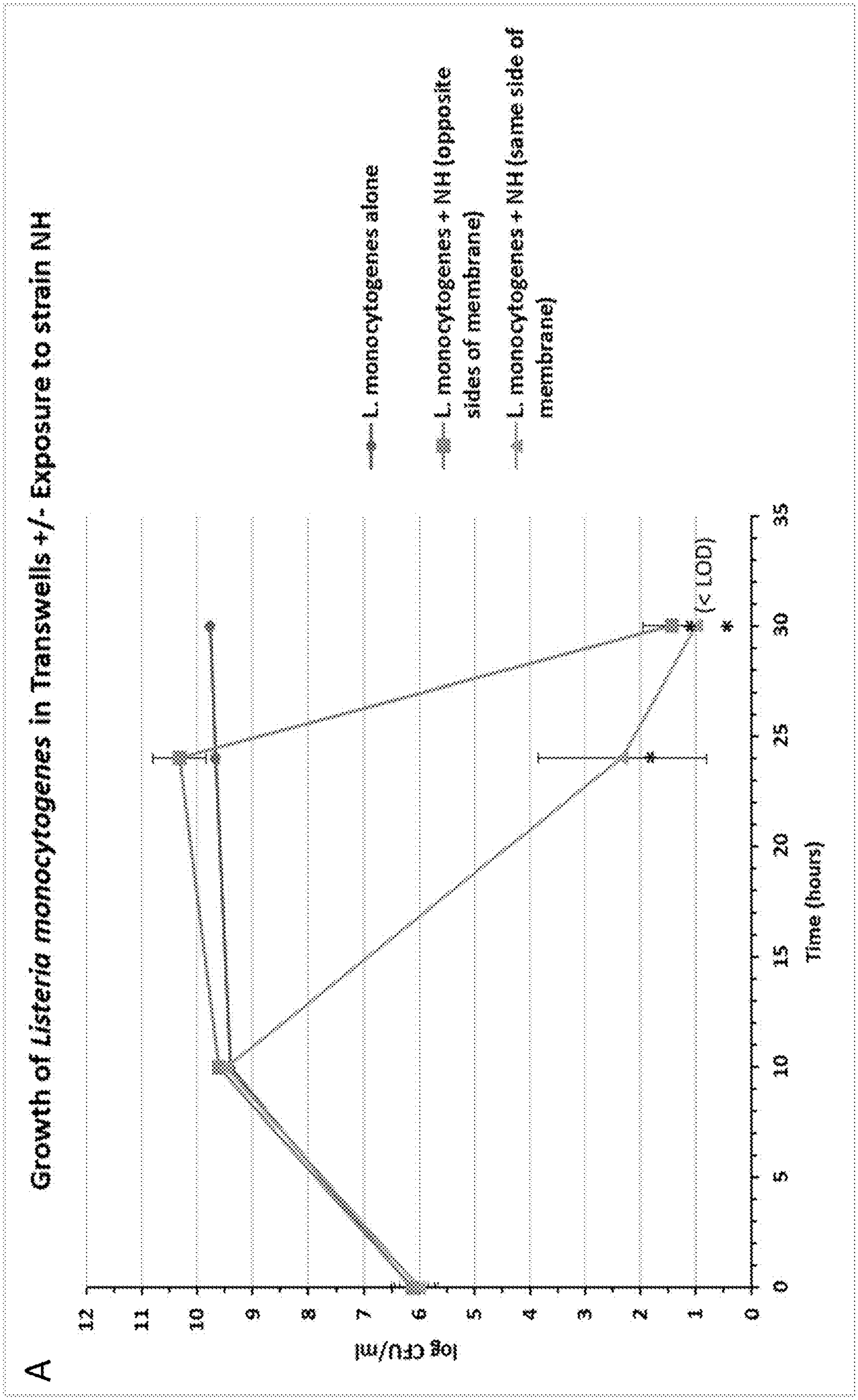
FIG. 13 shows graphs that demonstrate that co-culture with strain NH in a transwell plate inhibits *L. monocytogenes* cell growth. (A) Growth of *L. monocytogenes* alone and in mixed culture in transwell culture plates. The experiment was conducted as in FIG. 10, except aerobically (ambient air). (B) Control experiment that was run in parallel, which demonstrates that strain NH was unable to cross the membrane. Data points and brackets represent the mean and standard deviation of the mean of three independent experiments, respectively. Means marked with an asterisk (*) were significantly different from the data generated with *L. monocytogenes* alone at the same time point (P<0.05). "<LOD"=below the limit of detection.
Figure 13:
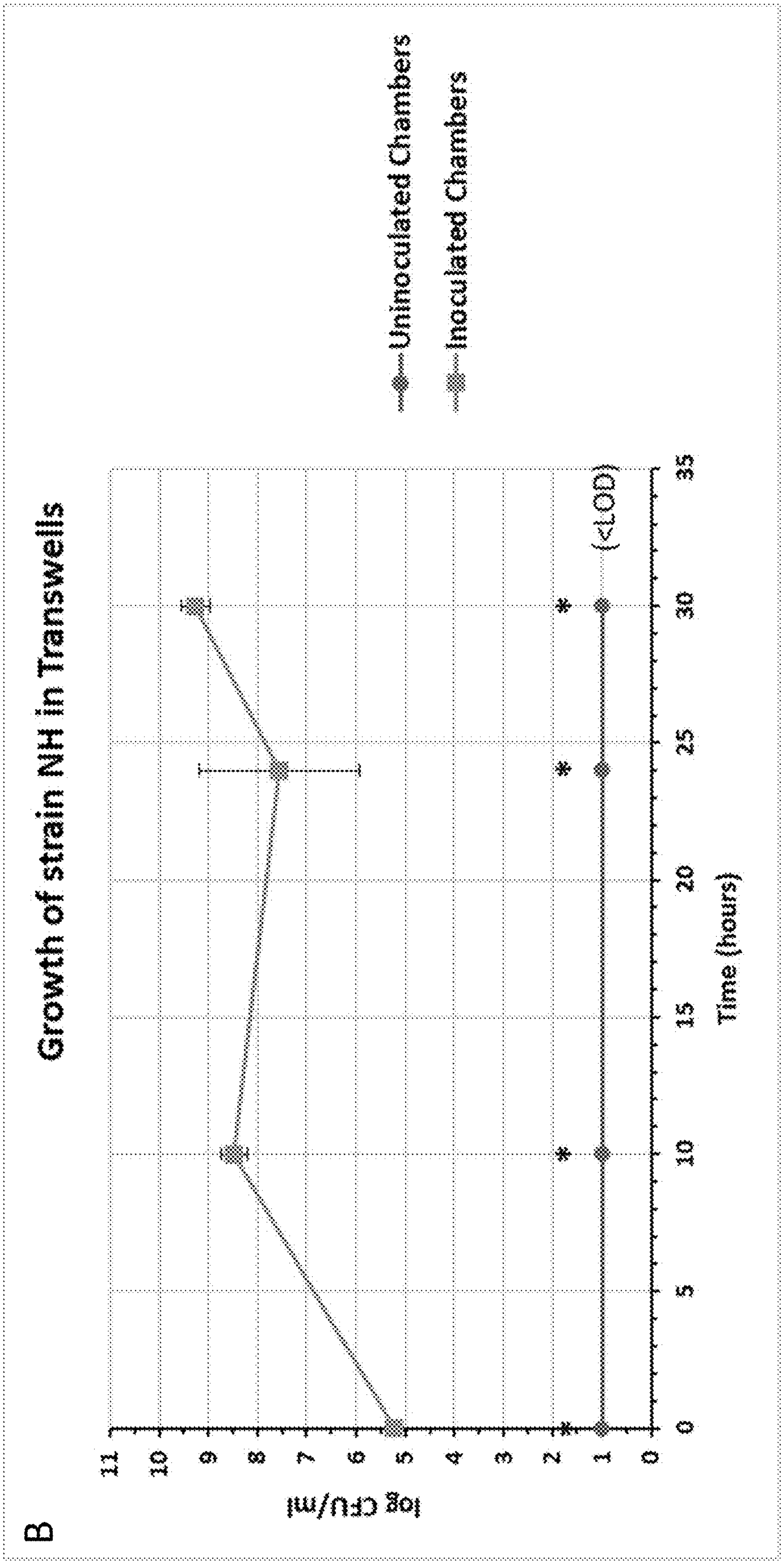
Figure 14:
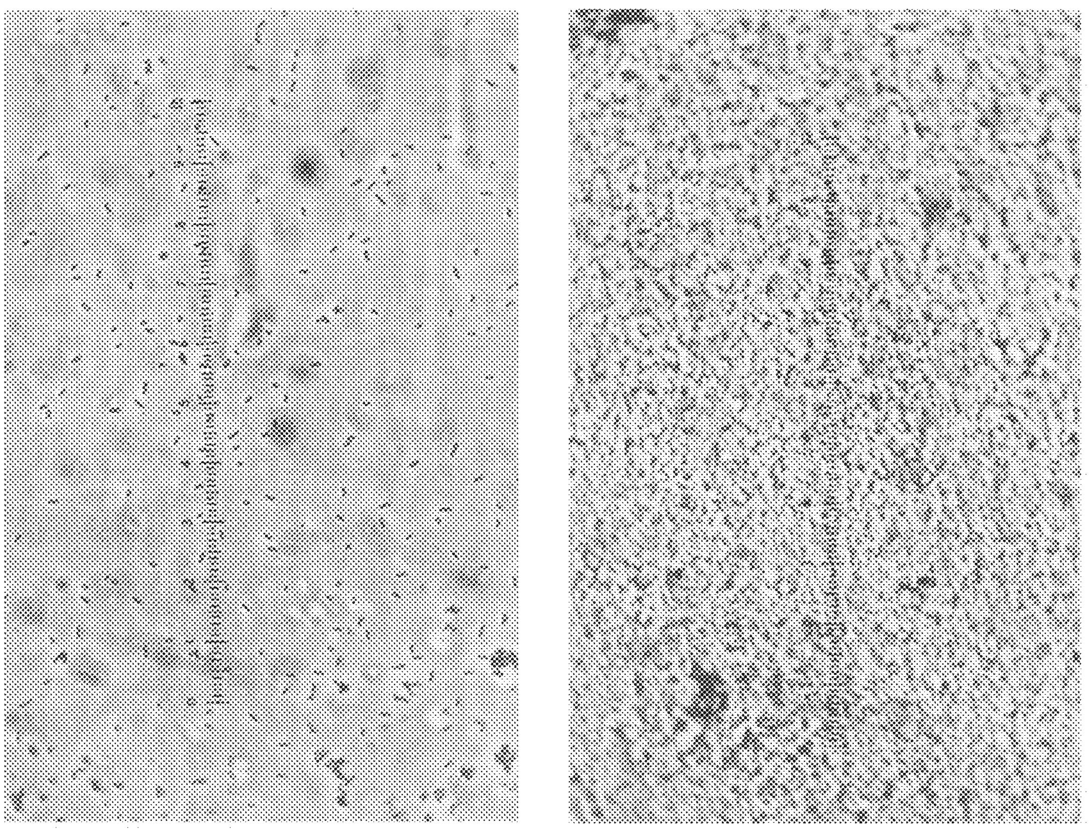
FIG. 14 shows photomicrographs that demonstrate that cell-free culture fluid from strain NH results in lysis of *L. monocytogenes* cells. (A) Photomicrograph of Gram stain of *L. monocytogenes* cells grown in transwell plates and not exposed to cell-free NH culture fluid, which exhibit a normal appearance. (B) Photomicrograph of Gram stain of *L. monocytogenes* cells grown in transwell plates and exposed to cell-free NH culture fluid, in which all cells appear to be lysed as evidenced by the granular appearance of cellular debris. Each small subdivision in the vernier scale represents one micrometer.

Strain NH Controls *Campylobacter jejuni* and *Listeria monocytogenes* in a Cell Contact-Independent Manner Ideally, the purified bactericidal protein would be tested for its control pathogens on food products such as meat, ready-to-eat foods, and produce, but unfortunately the protein was not isolated in sufficient quantity to test it directly on foods. Instead, the crude cell-free filtrate was tested in vitro against pathogens using transwell culture plates. The results of these experiments are shown in FIG. 12 and FIG. 13. Transwell plates consist of tissue culture wells that have an inner and outer chamber separated by a 0.4 micrometer membrane. This membrane prevents the strain NH cells from passing through it. When strain NH and the pathogen (i.e., *Campylobacter* or *Listeria*) were co-cultured on opposite sides of the membrane, pathogen growth was significantly reduced after 24 hours in the case of *Campylobacter jejuni* (FIG. 12) and after 30 hours in the case of *Listeria monocytogenes* (FIG. 13). *Listeria* cells of serotype 1/2a that were exposed to the strain NH cell-free fluid were found to be completely lysed, as evidenced from microscopy of *Listeria* cultures following exposure to the cell-free secretions that crossed the membrane and a side-by-side comparison to *Listeria* cultures that were not exposed to strain NH (FIG. 14). Strain NH cells were confirmed to be unable to pass through the membrane (FIG. 12B and FIG. 13B). These data suggest that strain NH secretes a bactericidal protein into the medium and provide preliminary evidence that the cell-free culture filtrate of strain NH could be used as a biopreservative on foods to protect against these foodborne pathogens.

Identification of the Bactericidal Protein Via Mass Spectrometry

The protein band enriched in the active fraction (FIG. 9) was cut out of the gel and submitted for mass spectrometry (MS) analysis. The protein in this band was found to be significantly similar to a known protein called anti-sigma factor FlgM. This protein is known to regulate the assembly of the bacterial flagellum and to be secreted from the bacterial cell (Hughes et al., 1993). Knowing the identity of this protein allowed us to identify the gene encoding it within the strain NH genome, as described below. Knowing the corresponding gene will allow a number of further investigations into the possible role of the protein in defense against pathogenic bacteria to be performed.

Identification of the Gene Encoding the Bactericidal Protein

Figure 16:
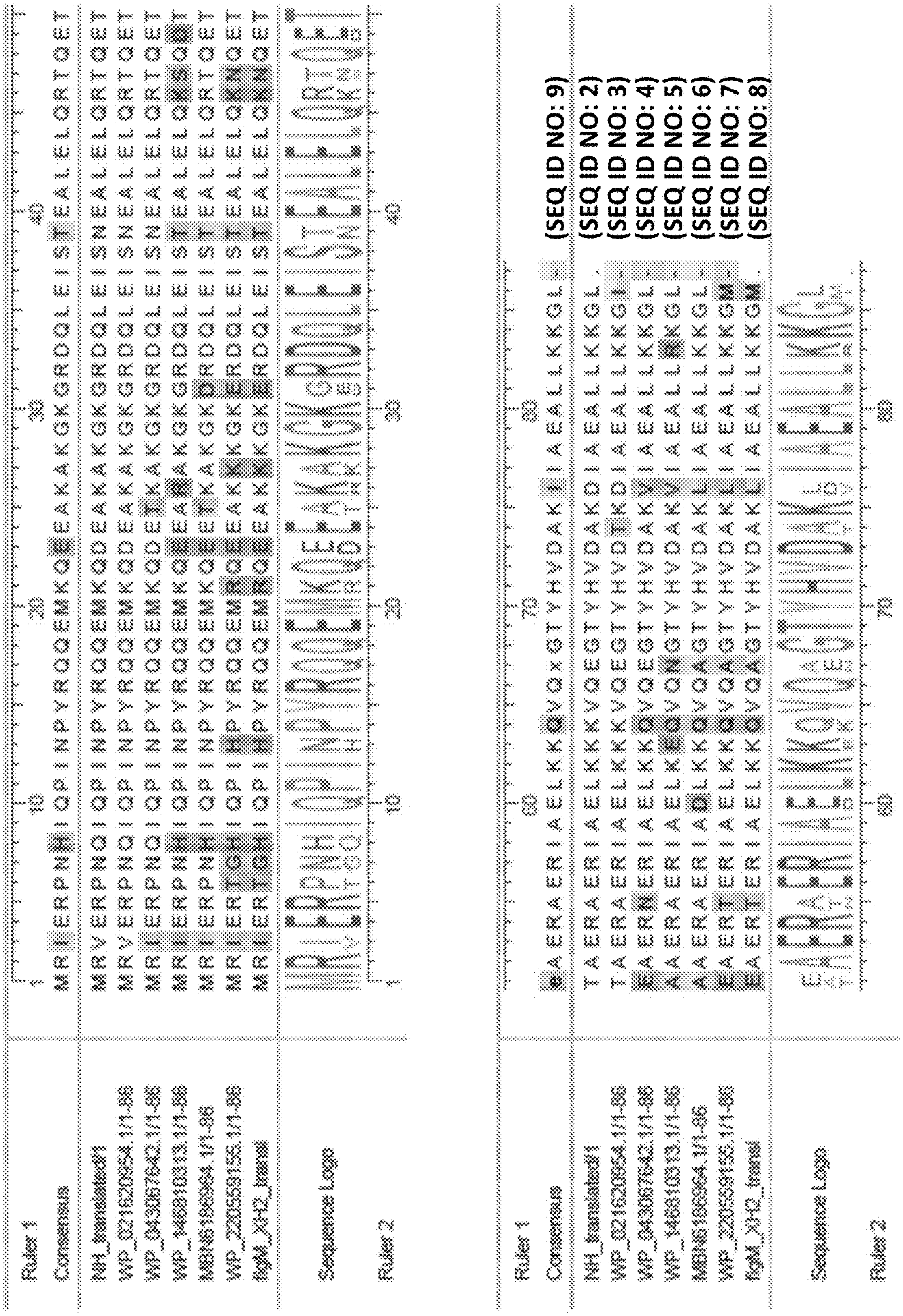
FIG. 16 shows an alignment of the sequence of the FlgM protein from strain NH (SEQ ID NO: 2) with the FlgM protein of several *Aneurinibacillus* species. WP_021620954=*A. aneurinilyticus* (SEQ ID NO: 3) and NH exhibit several non-conservative substitutions in comparison to the consensus sequence. These substitutions are H8Q, T39N, E51T, Q64K, and I76D. WP_043067642=*A. migulanus* FlgM (SEQ ID NO: 4); WP_146810313=*A. danicus* FlgM (SEQ ID NO: 5); MBN6186964=*Aneurinibacillus* sp. BA2021 (SEQ ID NO.

Peptide sequences identified by MS were used to find the corresponding gene in genetic databases. However, previous experiments had shown that PCR primers based on related species did not amplify the corresponding genes in strain NH, presumably due to naturally occurring mismatches in the DNA sequence (i.e., single-nucleotide polymorphisms). Therefore, we decided to have the entire genome of strain NH sequenced and then find the corresponding gene within the sequenced genome using DNA alignment algorithms. This approach was successful. An open reading frame was found via Smith-Waterman DNA alignment of the strain NH genome and the coding sequence of the flgM gene from *Aneurinibacillus* sp. XH2. Several different alignment algorithms (i.e., Smith-Waterman, MAFFT, MUSCLE) all gave the same or overlapping results with no gaps in the alignment. The identified open reading frame (FIG. 15; SEQ ID NO: 1) was subsequently translated into the corresponding protein sequence (SEQ ID NO: 2) and aligned with protein sequences of known FlgM proteins (FIG. 16). Although the FlgM protein of strain NH is highly related to that of species *Aneurinibacillus aneurinilyticus* (98% amino acid identity), these two species exhibit several non-conservative substitutions relative to the consensus sequence compiled by the alignment algorithm (FIG. 16). We speculate that these substitutions may represent gain-of-function mutations that have altered or added to the function of FlgM, but this hypothesis needs to be tested in future experiments. These potential gain-of-function mutations may explain why a gene known to be involved in flagellum biosynthesis (flgM) could be functioning in defense, i.e., instead of functioning in flagellum biosynthesis or in an additional "moonlighting" function. Such moonlighting by other proteins is known in the scientific literature (Singh and Bhalla, 2020). We have designed and obtained PCR primers that will allow us to clone and generate knock-out and knock-in-mutations of this gene for functional studies.

The sequenced genome of strain NH was also used as input for other computer programs designed to identify potential bactericidal proteins and peptides based on databases of such metabolites. Using these programs, we have identified several other candidate bactericidal loci that may contribute to the bactericidal effects of strain NH. For example, we used ANTISMASH to identify candidate loci that exhibit sequence similarity to known classes of bactericidal peptides. The identified candidate loci include proteusin at bp 1,216,931-1,237,167 of the NH genome, lassopeptide at bp 1,402,725-1,426,792, class I lanthipeptide at bp 1,728,275-1,753,544, class I lanthipeptide at bp 1,864,529-1,890,102, ranthipeptide at bp 4,386,717-4,412,104, and class I lanthipeptide at bp 5,076,154-5,100,707.

Species Attribution for Strain NH

To identify which species of bacteria strain NH belongs, we located and examined the 16s rRNA gene within the strain NH genome sequence. PCR primers that were previously described in the literature (Kozich et al., 2013) as binding to conserved sequences flanking the V4 region of the 16s rRNA gene were used to amplify this region from strain NH genomic DNA. The resulting PCR product was sequenced, and the resulting sequence was used in two different ways. First, it was used as the query sequence to search the RDP classifier database of Michigan State University, and second, it was used in a Smith-Waterman local alignment to the entire strain NH genome. The RDP database search result indicated that strain NH is a member of the genus *Aneurinibacillus* (FIG. 17). Using the Smith-Waterman alignment and a comparison of the surrounding sequence to the published 16s rRNA gene (Baker et al., 2003), we were able to obtain the entire 16s rRNA gene sequence of strain NH. This full-length 16s sequence was subsequently used as the query sequence to search for matching sequences using the BLAST algorithm search of all non-redundant nucleotide sequences in the NCBI database. The resulting BLAST search is shown in FIG. 18. Lastly, a MAFFT multiple sequence alignment and phylogenetic tree were constructed (FIG. 19). The results of the phylogenetic and the BLAST analysis are similar in that they both show that strain NH is highly related to species *Aneurinibacillus aneurinilyticus* and diverges from species *Aneurinibacillus migulanus*.

We conclude that strain NH is a member of the genus *Aneurinibacillus*, and that it is either a new strain of *Aneurinibacillus aneurinilyticus* or a new species within the *Aneurinibacillus* genus. The BLAST result (FIG. 18) suggests the former because the percent nucleotide sequence identity between *Aneurinibacillus aneurinilyticus* strain Murayama and strain NH is 99.9%, which exceeds the 98.7% cutoff established by Stackebrandt (Stackebrandt, 2006) for bacterial species identity. Thus, we propose to call strain NH "*Aneurinibacillus aneurinilyticus* strain NH".

Future Experiments:

Test Ability to Control Pathogens on Food Products

The bactericidal protein and/or cell-free protein extract containing the bactericidal protein will be mixed with chopped chicken meat and the pathogen *Campylobacter jejuni* at various levels of colony forming units per gram (CFU/gram) of meat. This mixture will be incubated at room temperature for defined periods of time, and then the numbers of surviving *C. jejuni* will be determined by dilution plating of the stomached meat. Controls will consist of *C. jejuni* alone added to the meat and meat alone with no additions of bacteria. All dilutions will be evaluated on modified charcoal cefoperazone deoxycholate agar (mCCDA), a selective medium for the enumeration of *C. jejuni*. Analogous experiments will be performed using ready-to-eat meats and produce for the testing of the ability of the bactericidal protein to control *Listeria monocytogenes* in these foods. Enumeration of *L. monocytogenes* will be performed on Modified Oxford agar with selective supplement for *Listeria monocytogenes*.

Industrial-Scale Production

The gene encoding the bactericidal protein will be introduced into a high-level producing strain of bacteria or yeast for industrial-scale production. Previous limitations on the production of bacteriocins have resulted from the fermentative nature of the producing strains. For example, nisin is a bacteriocin used commercially in the control of pathogens in milk and ready-to-eat meat products. However, nisin is produced by a lactic acid fermentative bacterium, *Lactococcus lactis*. The buildup of lactic acid eventually ends the fermentation process, limiting the amount of nisin that can be produced (Khelissa et al., 2021). The NH bacterium may not have the growth limitations of lactic acid bacteria, leading to potentially higher production.

REFERENCES

Baker, G. C., Smith, J. J., and Cowan, D. A. (2003). Review and re-analysis of domain-specific 16S primers. J. *Microbiol. Methods* 55, 541-555. doi: https://doi.org/10.1016/j.mimet.2003.08.009.

Hughes, K. T., Gillen, K. L., Semon, M. J., and Karlinsey, J. E. (1993). Sensing structural intermediates in bacterial flagellar assembly by export of a negative regulator. *Science* 262, 1277-1280. doi: 10.1126/science.8235660.

Kozich, J. J., Westcott, S. L., Baxter, N. T., Highlander, S. K., and Schloss, P. D. (2013). Development of a dual-index sequencing strategy and curation pipeline for analyzing amplicon sequence data on the MiSeq Illumina sequencing platform. *Appl. Environ. Microbiol.* 79, 5112-5120. doi: 10.1128/AEM.01043-13.

Singh, N., and Bhalla, N. (2020). Moonlighting proteins. *Annu. Rev. Genet.* 54, 265-285. doi: 10.1146/annurev-genet-030620-102906.

Stackebrandt, E. (2006). Taxonomic parameters revisited: tarnished gold standards. *Microbiol Today* 33, 152-155.

DEPOSIT INFORMATION

A deposit of the Board of Trustees of the University of Arkansas proprietary *Aneurinibacillus* bacterium strain designated as NH, disclosed above and recited in the appended claims, has been made with the ARS Culture Collection (NRRL), 1815 N. University Street, Peoria, IL 61604, and has been accepted under the terms of the Budapest Treaty. The date of deposit was Feb. 21, 2024. The deposit was found viable on Feb. 23, 2024. All restrictions will be irrevocably removed upon granting of a patent. This deposit is intended to meet all the requirements of 37 C.F.R. §§ 1.801-1.809. The NRRL accession number is B-68337. The deposit will be maintained in the depository for a period of thirty years, or five years after the last request, or for the enforceable life of the patent, whichever is longer, and will be replaced as necessary during that period.

What is claimed:

1. An anti-bacterial composition comprising a carrier and (a) an *Aneurinibacillus* bacterium designated as NH and deposited at the ARS Culture Collection (NRRL) under accession number B-68337, (b) one or more anti-bacterial proteins from a *Aneurinibacillus* bacterium designated as NH and deposited at the NRRL under accession number B-68337, or (c) a FlgM protein of SEQ ID NO: 2.

2. The anti-bacterial composition of claim 1, wherein the one or more anti-bacterial proteins each have a molecular weight of about 50 kDa or about 12 kDa.

3. The anti-bacterial composition of claim 2, wherein the one or more anti-bacterial proteins comprises the FlgM protein SEQ ID NO: 2.

4. The anti-bacterial composition of claim 1, wherein the anti-bacterial composition inhibits growth of *Campylobacter jejuni* and/or *Listeria monocytogenes*.

* * * * *

SEQUENCE LISTING

```
Sequence total quantity: 11
SEQ ID NO: 1            moltype = DNA  length = 261
FEATURE                 Location/Qualifiers
source                  1..261
                        mol_type = genomic DNA
                        organism = Aneurinibacillus sp.
                        strain = NH
SEQUENCE: 1
atgagagtcg aaaggccaaa tcaaattcag ccaatcaacc cgtatcgcca gcaagaaatg  60
aagcaggacg aagcaaaggc gaagggaaaa ggccgcgatc aactggaaat ctccaatgag  120
gcgctggagc ttcagcgtac acaggagaca acagccgaac gcgccgagcg cattgctgaa  180
ttgaaaaaga aggtacaaga aggaacatat catgtcgatg cgaaagacat cgcggaagca  240
ttactgaaga aaggcctata a                                              261

SEQ ID NO: 2            moltype = AA  length = 86
FEATURE                 Location/Qualifiers
source                  1..86
                        mol_type = protein
                        note = strain NH
                        organism = Aneurinibacillus sp.
SEQUENCE: 2
MRVERPNQIQ PINPYRQQEM KQDEAKAKGK GRDQLEISNE ALELQRTQET TAERAERIAE  60
LKKKVQEGTY HVDAKDIAEA LLKKGL                                         86

SEQ ID NO: 3            moltype = AA  length = 86
FEATURE                 Location/Qualifiers
source                  1..86
                        mol_type = protein
```

```
                          organism = Aneurinibacillus aneurinilyticus
SEQUENCE: 3
MRVERPNQIQ PINPYRQQEM KQDEAKAKGK GRDQLEISNE ALELQRTQET TAERAERIAE  60
LKKKVQEGTY HVDTKDIAEA LLKKGI                                        86

SEQ ID NO: 4              moltype = AA  length = 86
FEATURE                   Location/Qualifiers
source                    1..86
                          mol_type = protein
                          organism = Aneurinibacillus migulanus
SEQUENCE: 4
MRIERPNQIQ PINPYRQQEM KQDETKAKGK GRDQLEISNE ALELQRTQET EAERNERIAE  60
LKKQVQEGTY HVDAKVIAEA LLKKGL                                        86

SEQ ID NO: 5              moltype = AA  length = 86
FEATURE                   Location/Qualifiers
source                    1..86
                          mol_type = protein
                          organism = Aneurinibacillus danicus
SEQUENCE: 5
MRIERPNHIQ PINPYRQQEM KQEEARAKGK GRDQLEISTE ALELQKSQDT AAERAERIAE  60
LKEQVQNGTY HVDAKVIAEA LLRKGL                                        86

SEQ ID NO: 6              moltype = AA  length = 86
FEATURE                   Location/Qualifiers
source                    1..86
                          mol_type = protein
                          note = strain BA2021
                          organism = Aneurinibacillus sp.
SEQUENCE: 6
MRIERPNHIQ PINPYRQQEM KQEETKAKGK DRDQLEISTE ALELQRTQET AAERAERIAD  60
LKKQVQAGTY HVDAKLIAEA LLKKGL                                        86

SEQ ID NO: 7              moltype = AA  length = 86
FEATURE                   Location/Qualifiers
source                    1..86
                          mol_type = protein
                          organism = Aneurinibacillus thermoaerophilus
SEQUENCE: 7
MRIERTGHIQ PIHPYRQQEM RQEEAKKKGK ERDQLEISTE ALELQKNQET EAERTERIAE  60
LKKQVQAGTY HVDAKLIAEA LLKKGM                                        86

SEQ ID NO: 8              moltype = AA  length = 86
FEATURE                   Location/Qualifiers
source                    1..86
                          mol_type = protein
                          note = strain XH2
                          organism = Aneurinibacillus sp.
SEQUENCE: 8
MRIERTGHIQ PIHPYRQQEM RQEEAKKKGK ERDQLEISTE ALELQKNQET EAERTERIAE  60
LKKQVQAGTY HVDAKLIAEA LLKKGM                                        86

SEQ ID NO: 9              moltype = AA  length = 86
FEATURE                   Location/Qualifiers
source                    1..86
                          mol_type = protein
                          organism = synthetic construct
SEQUENCE: 9
MRIERPNHIQ PINPYRQQEM KQEEAKAKGK GRDQLEISTE ALELQRTQET EAERAERIAE  60
LKKQVQXGTY HVDAKIIAEA LLKKGL                                        86

SEQ ID NO: 10             moltype = DNA  length = 1506
FEATURE                   Location/Qualifiers
source                    1..1506
                          mol_type = genomic DNA
                          organism = Aneurinibacillus sp.
                          strain = NH
SEQUENCE: 10
gatcctggct caggacgaac gctggcggcg tgcctaatac atgcaagtcg agcggaccaa  60
agaagagctt gctcttcggc ggttagcggc ggacgggtga gtaacacgta ggcaacctgc  120
ctgtacgact gggataactc cgggaaaccg gagctaatac cggatacgtt tttcagaccg  180
catggtctga aagagaaaga cctttggtca cgtacagatg ggcctgcggc gcattagcta  240
gttggtgggg taacggccta ccaaggcgac gatgcgtagc cgacctgaga gggtgatcgg  300
ccacactggg actgagacac ggcccagact cctacgggag gcagcagtag ggaatcttcc  360
gcaatggacg aaagtctgac ggagcaacgc cgcgtgaacg atgaaggttt tcggatcgta  420
aagttctgtt gttagggaag aaccgccggg atgacctccc ggtctgacgg tacctaacga  480
gaaagccccg gctaactacg tgccagcagc cgcggtaata cgtagggggc aagcgttgtc  540
cggaattatt gggcgtaaag cgcgcgcagg cggcttctta agtcaggtgt gaaagcccac  600
ggctcaaccg tggagggcca cttgaaactg ggaggcttga gtgcaggaga ggagagcgga  660
```

-continued

```
attccacgtg tagcggtgaa atgcgtagag atgtggagga acacccgtgg cgaaggcggc  720
tctctggcct gtaactgacg ctgaggcgcg aaagcgtggg gagcgaacag gattagatac  780
cctggtagtc cacgccgtaa acgttgagtg ctaggtgttg gggactccaa tcctcagtgc  840
cgcagctaac gcaataagca ctccgcctgg ggagtacggc cgcaaggctg aaactcaaag  900
gaattgacgg ggacccgcac aagcggtgga gcatgtggtt taattcgaag caacgcgaag  960
aaccttacca gggcttgaca tcccgctgtc cctcctagag ataggagctc tcttcggagc  1020
agcggtgaca ggtggtgcat ggttgtcgtc agctcgtgtc gtgagatgtt gggttaagtc  1080
ccgcaacgag cgcaaccctt gtccttagtt gccagcattc agttgggcac tctagggaga  1140
ctgccgtcga caagacggag gaaggtgggg atgacgtcaa atcatcatgc cccttatgtc  1200
ctgggctaca cacgtgctac aatggatgga acaacgggca gccaactcgc gagagtgcgc  1260
caatccctta aaaccattct cagttcggat tgcaggctgc aactcgcctg catgaagccg  1320
gaatcgctag taatcgcgga tcagcatgcc gcggtgaata cgttcccggg tcttgtacac  1380
accgcccgtc acaccacgag agtttgcaac acccgaagtc ggtgaggtaa ccgcaaggag  1440
ccagccgccg aaggtggctt tatttggtta agccctcgac cgattagtat tcgtcagctc  1500
cgcgtg                                                             1506

SEQ ID NO: 11          moltype = DNA  length = 540
FEATURE                Location/Qualifiers
source                 1..540
                       mol_type = other DNA
                       organism = synthetic construct
SEQUENCE: 11
aggacgaacg ctggcggcgt gcctaataca tgcaagtcga gcggaccaaa gaagagcttg  60
ctcttcggcg gttagcggcg gacgggtgag taacacgtag gcaacctgcc tgtacgactg  120
ggataactcc gggaaaccgg agctaatacc ggatacgttt ttcagaccgc atggtctgaa  180
agagaaagac ctttggtcac gtacagatgg gcctgcggcg cattagctag ttggtggggt  240
aacggcctac caaggcgacg atgcgtagcc gacctgagag ggtgatcggc cacactggga  300
ctgagacacg gcccagactc ctacgggagg cagcagtagg gaatcttccg caatggacga  360
aagtctgacg gagcaacgcc gcgtgaacga tgaaggtttt cggatcgtaa agttctgttg  420
ttagggaaga accgccggga tgacctcccg gtctgacggt acctaacgag aaagccccgg  480
ctaactacgt gccagcagcc gcggtaatac gtagggggca agcgttgtcc ggaattattg  540
```